(12) United States Patent
Nakagawa et al.

(10) Patent No.: US 10,634,439 B2
(45) Date of Patent: Apr. 28, 2020

(54) ALUMINUM ALLOY BRAZING SHEET FOR A HEAT EXCHANGER, AND PROCESS FOR PRODUCING THE SAME

(71) Applicant: UACJ CORPORATION, Tokyo (JP)

(72) Inventors: Wataru Nakagawa, Chiyoda-Ku (JP); Satoshi Tanaka, Chiyoda-Ku (JP)

(73) Assignee: UACJ Corporation, Chiyoda-Ku (JP)

( * ) Notice: Subject to any disclaimer, the term of this patent is extended or adjusted under 35 U.S.C. 154(b) by 29 days.

(21) Appl. No.: 16/110,271

(22) Filed: Aug. 23, 2018

(65) Prior Publication Data

US 2018/0363995 A1 Dec. 20, 2018

Related U.S. Application Data

(63) Continuation of application No. PCT/JP2017/011960, filed on Mar. 24, 2017.

(30) Foreign Application Priority Data

Mar. 29, 2016 (JP) .................................. 2016-066406

(51) Int. Cl.
*B21B 1/22* (2006.01)
*F28F 21/08* (2006.01)
(Continued)

(52) U.S. Cl.
CPC .............. *F28F 21/084* (2013.01); *B21B 1/22* (2013.01); *B23K 1/008* (2013.01); *B23K 1/0012* (2013.01);
(Continued)

(58) Field of Classification Search
None
See application file for complete search history.

(56) References Cited

U.S. PATENT DOCUMENTS 8,158,273 B2 * 4/2012 Wittebrood .......... B23K 35/002
428/654
8,343,635 B2 * 1/2013 Matsumoto .......... B23K 1/0012
428/654
(Continued)

FOREIGN PATENT DOCUMENTS

CN 1918310 A 2/2007
CN 102431237 A 5/2012
(Continued)

OTHER PUBLICATIONS

International Search Report and Written Opinion (Application No. PCT/JP2017/011960) dated Jun. 20, 2017.
(Continued)

*Primary Examiner* — Daniel J. Schleis
(74) *Attorney, Agent, or Firm* — Burr & Brown, PLLC

(57) ABSTRACT

Provided are an aluminum alloy brazing sheet for heat exchangers, which exhibits excellent formability and brazeability, and an advantageous process for producing the same. The aluminum alloy brazing sheet for heat exchangers according to the present invention is configured such that: the aluminum alloy composition of a core material and the aluminum alloy composition and temper of a filler material are respectively controlled; and a core material portion of the brazing sheet has a specific electric resistivity at room temperature and a specific dispersion ratio of second phase particles. The brazing sheet is configured to further exhibit certain properties in terms of a work hardening exponent (n-value) where a nominal strain is within a range of 1%-2% and in terms of a push-in depth when a penetration crack is generated in a punch stretch forming test using a round-head punch having a diameter of 50 mm.

17 Claims, 1 Drawing Sheet

(51) Int. Cl.
| | | |
|---|---|---|
| *C22C 21/00* | (2006.01) | |
| *C22F 1/04* | (2006.01) | |
| *C22C 21/04* | (2006.01) | |
| *B23K 1/19* | (2006.01) | |
| *B23K 1/00* | (2006.01) | |
| *B23K 35/02* | (2006.01) | |
| *F28F 1/12* | (2006.01) | |
| *B23K 1/008* | (2006.01) | |
| *B32B 15/01* | (2006.01) | |
| *B23K 1/20* | (2006.01) | |
| *B23K 35/28* | (2006.01) | |
| *C22C 21/02* | (2006.01) | |
| *C22C 21/10* | (2006.01) | |
| *B23K 103/10* | (2006.01) | |
| *B23K 101/14* | (2006.01) | |
| *F28D 1/053* | (2006.01) | |

(52) U.S. Cl.
CPC ............... *B23K 1/19* (2013.01); *B23K 1/203* (2013.01); *B23K 35/0238* (2013.01); *B23K 35/286* (2013.01); *B23K 35/288* (2013.01); *B32B 15/016* (2013.01); *C22C 21/00* (2013.01); *C22C 21/02* (2013.01); *C22C 21/04* (2013.01); *C22C 21/10* (2013.01); *C22F 1/04* (2013.01); *F28F 1/12* (2013.01); *F28F 21/089* (2013.01); *B23K 2101/14* (2018.08); *B23K 2103/10* (2018.08); *F28D 1/0535* (2013.01); *Y10T 428/12764* (2015.01)

(56) References Cited

U.S. PATENT DOCUMENTS

| | | | |
|---|---|---|---|
| 9,878,402 | B2 * | 1/2018 | Ando ............... B23K 1/0012 |
| 9,993,897 | B2 * | 6/2018 | Kirkham ........... B23K 35/286 |
| 2005/0150642 | A1 | 7/2005 | Baumann |
| 2012/0129003 | A1 | 5/2012 | Ando et al. |
| 2016/0114435 | A1 | 4/2016 | Kanno et al. |
| 2016/0319401 | A1 | 11/2016 | Ando et al. |

FOREIGN PATENT DOCUMENTS

| | | |
|---|---|---|
| CN | 105229184 A | 1/2016 |
| JP | 2003-138355 A1 | 5/2003 |
| JP | 2011-195892 A1 | 10/2011 |
| JP | 2012-017503 A1 | 1/2012 |
| JP | 2012-117107 A1 | 6/2012 |
| JP | 2012-224923 A1 | 11/2012 |
| JP | 2013-036099 A1 | 2/2013 |
| WO | 2015/104760 A1 | 7/2015 |

OTHER PUBLICATIONS

Chinese Office Action (Application No. 201780021546.7) dated Oct. 30, 2019 (with English translation).

* cited by examiner

ALUMINUM ALLOY BRAZING SHEET FOR A HEAT EXCHANGER, AND PROCESS FOR PRODUCING THE SAME

This application is a continuation of the International Application No. PCT/JP2017/011960 filed on Mar. 24, 2017, the entireties of which are incorporated herein by reference.

BACKGROUND OF THE INVENTION

Field of the Invention

The present invention relates to an aluminum alloy brazing sheet for a heat exchanger and a process for producing the same. In particular, the present invention relates to an aluminum alloy brazing sheet for a heat exchanger, which has excellent formability and brazeability, and a process for advantageously producing the same. The aluminum alloy brazing sheet for a heat exchanger according to the invention is advantageously adopted as a structural member of a heat exchanger for an automobile.

Description of Related Art

In recent years, resource and energy conservation is an essential issue in every industrial field. Also in the automobile industry, an effort to reduce the weight of an automobile has been made to solve the issue, and thus a heat exchanger for an automobile is required to be smaller and lighter. Various methods have been suggested to solve the issue, and one of such methods is improvement of efficiency of heat radiation by precise processing of structural members. To realize this, it is desired to improve dimensional accuracy of the formed structural members, that is to say, to improve formability of the structural members.

Meanwhile, as heat exchangers for automobile such as a condenser and an evaporator, ones formed of an aluminum alloy, which is light and excellent in strength and thermal conductivity and is used as a heat exchanger material, are widely used. In recent years, those heat exchangers formed of the aluminum alloy are spreading also for a room air conditioner. The heat exchangers consist of tubes and headers which function as passages for a working liquid, plates which change a direction of flow of the working liquid, fins which function as media of heat transfer, side plates which ensure durability, and any other members, and are produced by joining these members at a multiplicity of points by brazing. The joining by brazing is performed by a process in which each constituent member of the heat exchanger, which incorporates a filler material, is heated to about 600° C. so as to supply a molten filler material to a joint and fill gaps of the joint with the filler material, and then the constituent member is cooled. In particular, with respect to the heat exchangers for the automobile, a method in which the constituent members each provided with a fluoride-based flux adhering thereto are assembled together, to form the heat exchanger having a predetermined structure, and are heated in an inert gas atmosphere in a furnace to join the constituent members together by brazing is performed is generally used.

To braze the above-described constituent members of the heat exchanger, the aluminum alloy brazing sheet for the heat exchanger is adopted. Thus, various studies have been made so far with respect to material compositions and production processes of the aluminum alloy brazing sheet so as to improve its formability.

For example, Patent Document 1 (JP2013-036099A1) discloses an aluminum alloy brazing sheet having excellent formability. This brazing sheet is given an O temper, and its core material has a reduced average diameter of grains. However, in the brazing sheet formed of a metal given the O temper, a portion of the sheet which does not have a sufficient strain remaining in the formed sheet is difficult to be recrystallized during heating for brazing and easy to be subjected to erosion by a filler material. Thus, the brazing sheet has an inherent problem that desired brazeability cannot be achieved for every type of forming.

Furthermore, Patent Document 2 (JP5737798B2) discloses an aluminum alloy brazing sheet having excellent formability, in which sheet generation of enormous intermetallic compounds in a casting process is suppressed, to increase tensile strength of the brazing sheet, so that a desired texture is grown in the core material. However, as described in paragraph [0036] and Tables 3 to 5 in Patent Document 2, depth of erosion by the filler material in the brazing sheet is more than twice the thickness of the filler material, thereby causing a problem that desired brazeability is difficult to be achieved.

Accordingly, one of the problems to be solved with respect to the aluminum alloy brazing sheet for the heat exchanger is to improve both of its formability and brazeability.

SUMMARY OF THE INVENTION

The present invention was made in view of the background art described above. Therefore, it is a problem of the invention to be solved to provide an aluminum alloy brazing sheet for a heat exchanger, which has excellent formability and brazeability. It is another problem of the invention to be solved to provide an advantageous process for producing the same.

The inventors of the invention made intensive studies to achieve the above-described problems, and found that, first, with respect to a core material, contents of Si and Fe should be controlled, and that a content of Mn should be further controlled to be higher than a total content of Si and Fe, so as to suppress formation of Al—Mn-based intermetallic compounds, Al—Si—Mn-based intermetallic compounds, Al—Fe—Mn-based intermetallic compounds and Al—Si—Fe—Mn-based intermetallic compounds, hereinafter these intermetallic compounds being referred to as "Mn-based intermetallic compounds", so that a desired amount of solid-solubilized solute atoms can be obtained.

Furthermore, the inventors also found that, in the case a cladded material is produced by hot-rolling a layered material of the core material and a skin material, it is preferable to reduce a rate of strain of a sheet due to reduction of its thickness in each pass in the hot clad-rolling process (or hot rolling process for joining) and control a temperature of the layered material during the hot clad-rolling so as to be low, so that formation of the Mn-based intermetallic compounds is suppressed and the desired amount of solid-solubilized solute atoms can be obtained, whereby a predetermined dispersion state of second phase particles is obtained.

In addition, it was recognized that the sheet given the H temper instead of the O temper enjoys suppression of erosion by the filler material in a part of the formed sheet where there is a reduced amount of remaining strain.

Furthermore, it was found that a rolled sheet having a uniformly distributed work straining and a high degree of flatness can be obtained by ensuring properties that a work hardening exponent n-value is not less than 0.010 where a nominal strain is within a range of 1%-2%; a push-in depth is not less than 10 mm when a penetration crack is generated in a punch stretch forming test using a round-head punch having a diameter of 50 mm; and then lattice defects are likely to be uniformly introduced inside the material under both of uniaxial stretching and biaxial stretching.

As described above, the inventors of the invention found that the brazing sheet in which the composition of the aluminum alloy, the temper and the metal structure are controlled so as to achieve desired properties has a high degree of flatness as the rolled sheet, so that the formed sheet has high dimensional accuracy, as well as formability. Furthermore, the brazing sheet is also excellent in brazeability because the core material is subjected to recrystallization during heating for brazing to form large recrystallized grains. Thus, the inventors found the aluminum alloy brazing sheet which are excellent in both of formability and brazeability, and reached the present invention.

The above-described problems can be solved according to one mode of the invention, which provides an aluminum alloy brazing sheet for a heat exchanger, comprising a core material, a first filler material cladded on one surface of the core material and a second filler material cladded on the other surface of the core material, wherein: the core material consists of an Al alloy including 0.05-0.6% by mass of Si, 0.05-0.7% by mass of Fe and 0.6-2.0% by mass of Mn, the balance being Al and inevitable impurities, contents of Si, Fe and Mn satisfying a formula: Si+Fe≤Mn; and each of the first and second filler materials consists of an Al—Si based alloy including 4.5-13.0% by mass of Si and 0.05-0.8% by mass of Fe, the balance being Al and inevitable impurities, and wherein the brazing sheet is given a temper designation of HXY, X being 1 or 2 and Y being a natural number from 2 to 6, and has an electric resistivity at room temperature of 31-50nΩm in a portion formed of the core material; a dispersion ratio of second phase particles having a circle equivalent diameter of not more than 0.5 μm is 5-50%·μm$^{-1}$ in the portion formed of the core material, the dispersion ratio of the second phase particles being defined as f/r, wherein f (%) represents an area ratio of the second phase particles while r (μm) represents an average circle equivalent diameter of the second phase particles; the brazing sheet has an n-value of a work hardening exponent of not less than 0.010, where a nominal strain is within a range of 1%-2%; and the brazing sheet has a push-in depth of not less than 10 mm when a penetration crack is generated in a punch stretch forming test using a round-head punch having a diameter of 50 mm.

The above-described problems can also be solved according to another mode of the invention, which provides an aluminum alloy brazing sheet for a heat exchanger, comprising a core material, a first filler material cladded on one surface of the core material, an intermediate layer material cladded on the other surface of the core material, and a second filler material cladded on a surface of the intermediate layer material opposite to the core material, wherein: the core material consists of an Al alloy including 0.05-0.6% by mass of Si, 0.05-0.7% by mass of Fe and 0.6-2.0% by mass of Mn, the balance being Al and inevitable impurities, contents of Si, Fe and Mn satisfying a formula: Si+Fe≤Mn; each of the first and second filler materials consists of an Al—Si based alloy including 4.5-13.0% by mass of Si and 0.05-0.8% by mass of Fe, the balance being Al and inevitable impurities; and the intermediate layer material consists of an Al alloy including 0.05-0.6% by mass of Si, 0.05-0.7% by mass of Fe and 0.05-5.0% by mass of Zn, the balance being Al and inevitable impurities, and wherein the brazing sheet is given a temper designation of HXY, X being 1 or 2 and Y being a natural number from 2 to 6, and has an electric resistivity at room temperature of 31-50nΩm in a portion formed of the core material; a dispersion ratio of second phase particles having a circle equivalent diameter of not more than 0.5 μm is 5-50%·μm$^{-1}$ in the portion formed of the core material, the dispersion ratio of the second phase particles being defined as f/r, wherein f (%) represents an area ratio of the second phase particles while r (μm) represents an average circle equivalent diameter of the second phase particles; and the brazing sheet has an n-value of a work hardening exponent of not less than 0.010, where a nominal strain is within a range of 1%-2%; and the brazing sheet has a push-in depth of not less than 10 mm when a penetration crack is generated in a punch stretch forming test using a round-head punch having a diameter of 50 mm.

In a preferable embodiment of the aluminum alloy brazing sheet for a heat exchanger according to the invention, the Al alloy constituting the core material further includes at least one of 0.05-1.0% by mass of Cu and 0.05-3.0% by mass of Zn, and with or in place of Cu and/or Zn, includes at least one of 0.05-0.3% by mass of Ti, 0.05-0.3% by mass of Zr and 0.05-0.3% by mass of Cr.

In another preferable embodiment of the aluminum alloy brazing sheet for a heat exchanger according to the invention, the Al—Si based alloy constituting the first or second filler material further includes at least one of 0.05-1.5% by mass of Cu and 0.05-5.0% by mass of Zn, and with or in place of Cu and/or Zn, includes at least one of 0.003-0.05% by mass of Na and 0.03-0.05% by mass of Sr.

Furthermore, in the invention, the aluminum alloy constituting the intermediate layer material further comprises 0.05-2.0% by mass of Mn.

The above-described aluminum alloy brazing sheet for a heat exchanger according to the invention is also advantageously produced by a process comprising a step of performing a hot clad-rolling process wherein the filler materials, or the filler materials and the intermediate layer material, each of which are rolled to have a predetermined thickness, are stacked on opposite surfaces of the core material to form a laminar material, and the laminar material is subjected to hot rolling, and wherein a maximum rate of strain of a sheet of the laminar material with reduction of its thickness in each pass during a hot rolling operation in the hot clad-rolling process is 0.5-10s$^{-1}$; and a maximum temperature of the laminar material during the hot rolling operation is held within a range of 400-510° C.

In addition, the invention also provides a structural member for a heat exchanger and a fin for a heat exchanger formed of the above-described aluminum alloy brazing sheet according to the invention.

In the aluminum alloy brazing sheet according to the present invention, alloy compositions of the core material and two filler materials cladded on each of the opposite sides of the core material are controlled, and also the temper and metal structure are controlled so as to achieve desired properties, whereby the brazing sheet can exhibit excellent brazeability as well as excellent formability. The brazing sheet having such excellent properties is used for a structural member and a fin of a heat exchanger for an automobile.

Furthermore, a method of producing the aluminum alloy brazing sheet for the heat exchanger according to the invention permits a reduced rate of strain of a sheet due to reduction of its thickness in each pass in the hot clad-rolling process, so that the temperature of the layered material in the hot clad-rolling process is controlled to be low. Thus, formation of Mn-based compounds is suppressed so as to obtain a desired amount of solid-solubilized solute atoms and a predetermined ratio of dispersion of second phase particles, whereby the brazing sheet having desired properties is advantageously produced.

DETAILED DESCRIPTION OF THE INVENTION

Figure 1:
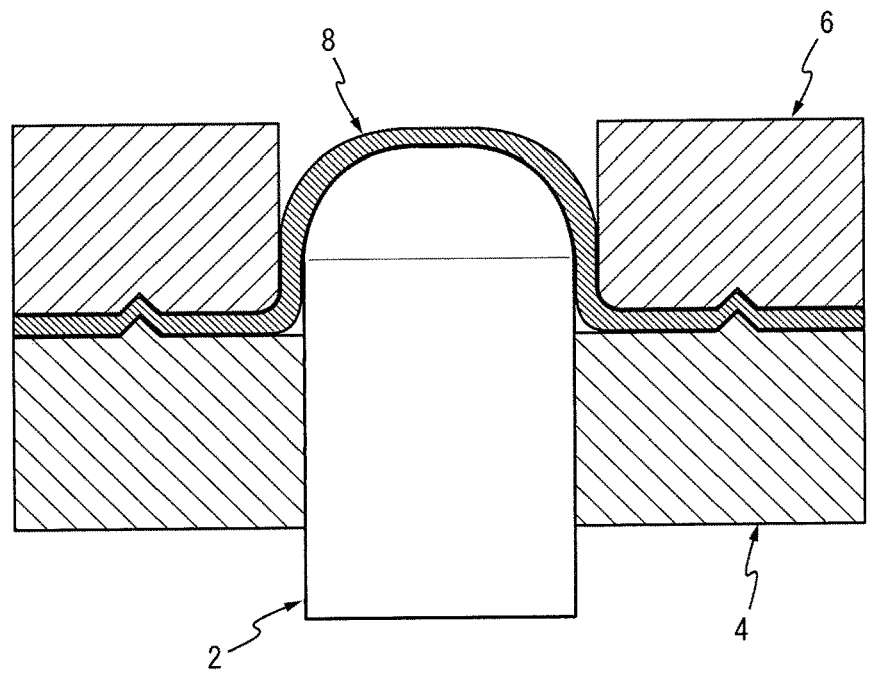
FIG. 1 is a schematic cross sectional view showing a manner of evaluating a push-in depth of a brazing sheet by using a device for the punch stretch forming test according to the invention.

An aluminum alloy brazing sheet for a heat exchanger and a process for producing the same according to the invention is described below in detail.

1. Aluminum Alloy Brazing Sheet

The aluminum alloy brazing sheet for the heat exchanger according to the invention is a layered product including three layers consisting of a core material (or metal), a first filler material (or metal) cladded on one side of the core material and a second filler material cladded on the other side of the core material, or a layered product including four layers wherein an intermediate layer material (or metal) is further cladded between the core material and the second filler material. Each of the core material, the first filler material, the second filler material and the intermediate layer material which constitute the layered product is formed of an aluminum alloy having a specific alloy composition, and has a predetermined temper, a predetermined metal structure and predetermined properties. Significance and reasons of defining such characteristics will be described below.

1-1. Core Material

First of all, an aluminum alloy constituting the core material comprises Si, Fe and Mn as essential alloy components.

Si, which is one of the essential alloy components, contributes to improvement of formability and brazeability, and its content in the aluminum alloy should be controlled so as to be within a range of 0.05-0.6% by mass ("% by mass" being hereinafter represented simply as "%"). In the case where the content of Si is less than 0.05%, the amount of solid-solubilized solute atoms is excessively large, so that the core material fails to be subjected to recrystallization during heating for brazing, and suffers from erosion by the filler material, resulting in difficulty to achieve desirable brazeability. On the other hand, in the case where the content of Si is more than 0.6%, the amount of solid-solubilized solute atoms is too small, so that the n-value is too low and desirable formability cannot be obtained. The content of Si is preferably 0.05-0.4%, and more preferably 0.05-0.2%.

Fe, which is another of the essential alloy components, also contributes to improvement of formability and brazeability, and its content in the aluminum alloy should be controlled so as to be within a range of 0.05-0.7%. In the case where the content of Fe is less than 0.05%, the amount of solid-solubilized solute atoms is excessively large, so that the core material fails to be subjected to recrystallization during heating for brazing, and suffers from erosion by the filler material, resulting in difficulty to achieve desirable brazeability. On the other hand, in the case where the content of Fe is more than 0.7%, the amount of solid-solubilized solute atoms is too small, so that the n-value is too low and desirable formability cannot be obtained. The content of Fe is preferably 0.05-0.5%, and more preferably 0.05-0.3%.

Furthermore, Mn, which is the remaining one of the essential alloy components, contributes to improvement of formability, and its content in the aluminum alloy should be controlled so as to be within a range of 0.6-2.0%. In the case where the content of Mn is less than 0.6%, the amount of solid-solubilized solute atoms is too small, so that the n-value is too low, and desirable formability cannot be obtained. On the other hand, in the case where the content of Mn is more than 2.0%, coarse crystallized products are formed during casting, thereby causing problems in production. The content of Mn is preferably 0.6-1.8%, and more preferably 0.6-1.6%.

The contents of the alloy components Si, Fe and Mn are controlled so as to satisfy the formula: $Si+Fe \leq Mn$. In the case where the total contents of Si and Fe exceed the content of Mn, an excessive amount of Mn-based compounds is formed and there is a problem that the amount of solid-solubilized solute atoms is too small, so that the n-value is too low and desirable formability cannot be obtained. Preferably, the contents of the alloy components are controlled to satisfy the formula: $Si+Fe \leq 0.9 \times Mn$.

The aluminum alloy constituting the core material can further include at least one of Cu and Zn as a first optional additive element, in addition to the above-described essential elements. Both Cu and Zn are solid-solubilized so as to contribute to improvement of formability. The content of Cu, which is one of those additive elements, is within a range of 0.05-1.0%. In the case where the content of Cu is less than 0.05%, the above-described effect cannot be exhibited sufficiently. On the other hand, in the case where the content of Cu is more than 1.0%, a corrosion rate is increased, so that a sufficient self-corrosion resistance cannot be obtained. The content of Cu is preferably 0.05-0.8%, and more preferably 0.05-0.6%. The content of Zn, which is the other of the first optional additive elements, is controlled to be within a range of 0.05-3.0%. In the case where the content of Zn is less than 0.05%, it is difficult to obtain the above-described effect. On the other hand, in the case where the content of Zn is more than 3.0%, the corrosion rate is increased, so that the sufficient self-corrosion resistance cannot be obtained. The content of Zn is preferably 0.05-2.5%, and more preferably 0.05-2.0%.

The aluminum alloy constituting the core material can still further include at least one second optional element selected from Ti, Zr and Cr. All of Ti, Zr and Cr contribute to improvement of the self-corrosion resistance. Ti has an effect to allow the corrosion to progress in the surface direction of the sheet, so as to delay corrosion in the direction of the thickness of the sheet. Zr and Cr have an effect to increase the size of recrystallized grains during heating for brazing. It is preferable that each of the contents of Ti, Zr and Cr is set to be within the range of 0.05-0.3%. In the case where the contents of Ti, Zr and Cr are less than 0.05%, it is difficult to obtain the above-described effect. On the other hand, in the case where the contents Ti, Zr and Cr are more than 0.3%, coarse crystallized products are formed during casting, thereby causing deterioration of productivity. The contents of Ti, Zr and Cr are preferably 0.05-0.2%, and more preferably 0.05-0.15%.

It is noted that the core material is configured so as to have a thickness not less than 60% of a thickness of the aluminum alloy brazing sheet, in other word, such that its clad ratio is not less than 60%. The clad ratio of the core material is preferably set to be not less than 70%. If the clad ratio of the core material is less than 60%, the core material cannot perform the desired functions.

1-2. First and Second Filler Materials

Each of the aluminum alloys which constitute the first and second filler materials cladded on the opposite sides of the core material comprises Si and Fe as essential alloy components. The aluminum alloy constituting the first filler material and the aluminum alloy constituting the second filler material may be the same alloy, or the different alloys, as well.

Si, which is contained in the aluminum alloy constituting the filler material, contributes to improvement of brazeability, and its content is controlled to be within a range of 4.5-13.0%. In the case where the content of Si is less than 4.5%, the amount of a molten filler material is small, and it is difficult to obtain desired brazeability. On the other hand, in the case where the content of Si is more than 13.0%, the amount of the molten filler material is large, and erosion by the filler material is caused, resulting in insufficient brazeability. The content of Si is preferably 4.5-11%, and more preferably 4.5-9.5%.

Fe, which is another of the essential alloy components, also contributes to improvement of brazeability, and its content is set to be within a range of 0.05-0.8%. In the case where the content of Fe is less than 0.05%, the fluidity of the filler material is reduced, resulting in difficulty to achieve desirable brazeability. On the other hand, in the case where the content of Fe is more than 0.8%, the corrosion rate is increased, so that the sufficient self-corrosion resistance cannot be obtained. The content of Fe is preferably 0.05-0.7%, and more preferably 0.05-0.5%.

It is also acceptable to add at least one of Cu and Zn as a first optional additive element to the aluminum alloys constituting each of the filler materials, in addition to the above-described essential elements. Both Cu and Zn are solubilized so as to contribute to improvement of formability. The content of Cu, which is one of the first optional additive elements, is set to be within a range of 0.05-1.5%. In the case where the content of Cu is less than 0.05%, the above-described effect cannot be exhibited sufficiently. On the other hand, in the case where the content of Cu is more than 1.5%, the corrosion rate is increased, so that the sufficient self-corrosion resistance cannot be obtained. The content of Cu is preferably 0.05-0.7%, and more preferably 0.05-0.5%. The content of Zn, which is the other of the first optional additive elements, is set to be within a range of 0.05-5.0%. In the case where the content of Zn is less than 0.05%, the above-described effect cannot be exhibited sufficiently. On the other hand, in the case where the content of Zn is more than 5.0%, Zn is condensed on a fillet at the joining portion, and the corrosion rate of the fillet is increased, resulting in a problem that it is difficult to obtain a sufficient corrosion resistance of the fillet. The content of Zn is preferably 0.05-4.0%, and more preferably 0.05-3.0%.

It is also acceptable to add at least one of Na and Sr as a second optional additive element to the aluminum alloys constituting each of the filler materials, in addition to the above-described essential elements. Both Na and Sr as the second optional additive elements contribute to improvement of the fluidity of the filler material. The content of each of Na and Sr is set to be within the range of 0.003-0.05%. In the case where the content of Na and Sr is less than 0.003%, the above-described effect cannot be exhibited sufficiently. On the other hand, in the case where the content of Na and Sr is more than 0.05%, the viscosity of the molten filler material is increased, and the fluidity of the filler material is reduced, thereby causing a problem of deterioration of brazeability. The content of Na and Sr is preferably 0.003-0.04%, and more preferably 0.003-0.03%.

The first and second filler materials consisting of the aluminum alloys having the above-described alloy compositions are present in the desired aluminum alloy brazing sheet such that the clad ratios of each of the filler material are set to be within a range of around 4-15%.

1-3. Intermediate Layer Material

The intermediate layer material is disposed between the core material and the second filler material, so as to form a brazing sheet having a four-layer structure. The aluminum alloy constituting the intermediate layer material contains Si, Fe and Zn as essential alloy components.

Si in the aluminum alloy constituting the intermediate layer material contributes to improvement of productivity and self-corrosion resistance, and its content is set to be within the range of 0.05-0.6%. In the case where the content of Si is less than 0.05%, deformation resistance at a high temperature is lowered and bondability in the hot clad-rolling is deteriorated, so that desired productivity cannot be obtained. On the other hand, in the case where the content of Si is more than 0.6%, the corrosion rate is increased, thereby causing a problem that the sufficient self-corrosion resistance cannot be obtained. The content of Si is preferably 0.05-0.4%, and more preferably 0.05-0.2%.

Fe, which is another of the essential alloy components, also contributes to improvement of productivity and self-corrosion resistance, and its content is controlled so as to be within a range of 0.05-0.7%. In the case where the content of Fe is less than 0.05%, deformation resistance at a high temperature is lowered and bondability in the hot clad-rolling is deteriorated, thereby causing problems in productivity of the brazing sheet. On the other hand, in the case where the content of Fe is more than 0.7%, the corrosion rate is increased, thereby causing a problem that the self-corrosion resistance is deteriorated. The content of Fe is preferably 0.05-0.5%, and more preferably 0.05-0.3%.

Zn, which is the last one of the essential alloy components, contributes to improvement of formability and the self-corrosion resistance, and its content is set to be within a range of 0.05-5.0%. In the case where the content of Cu is less than 0.05%, the above-described effect cannot be exhibited sufficiently. On the other hand, in the case where the content of Zn is more than 5.0%, the corrosion rate is increased, thereby causing a problem that the self-corrosion resistance is deteriorated. The content of Zn is preferably 0.05-4.0%, and more preferably 0.05-3.0%.

It is also acceptable to add Mn as an optional additive element to the aluminum alloy constituting the intermediate layer material, in addition to the above-described essential elements. Mn as the optional additive element is solid-solubilized and contributes to improvement of formability, and its content is set to be within a range of 0.05-2.0%. In the case where the content of Mn is less than 0.05%, the above-described effect cannot be exhibited sufficiently. On the other hand, in the case where the content of Mn is more than 2.0%, coarse crystallized products are formed during casting, thereby causing problems in productivity of the brazing sheet. The content of Mn is preferably 0.05-1.8%, and more preferably 0.05-1.6%.

The intermediate layer material consisting of the aluminum alloy having the above-described alloy compositions is present in the desired aluminum alloy brazing sheet such that its clad ratio is set to be within a range of around 4-15%.

It is noted that the aluminum alloy constituting each of the above-described core material, filler materials and intermediate layer material may include Mg, Ca and other inevitable impurity elements as far as they do not affect the properties of the brazing sheet. In that case, if the content of each of these elements is not more than 0.05% and the total content of the elements is not more than 0.15%, the elements do not significantly affect the effects of the invention.

1-4. Temper

Controlling the temper contributes to improvement of brazeability, and the aluminum alloy brazing sheet according to the invention has a temper represented by HXY (wherein X is 1 or 2, and Y is a natural number from 2 to 6). The brazing sheet having the above-described temper can be obtained, as known well, by the conventional tempering or thermal refining operation. The brazing sheet may be the one subjected only to work hardening (without final annealing) or the one subjected to an appropriate degree of annealing (final annealing) after the work hardening. In the brazing sheet whose temper is O, H11 or H21, erosion by the filler material is caused at a portion of the brazing sheet which does not have a sufficient remaining strain after its formation, so that it is difficult to obtain desired brazeability. In the brazing sheet whose temper is H17, H18, H19, H27, H28 or H29, a driving force for recrystallization during heating for brazing is excessively high, so that recrystallized grains in the core material are fine and erosion by the filler material is caused, resulting in poor brazeability. It is noted that the meaning of the temper designations used here is in conformity with the definition of JIS-H-0001.

1-5. Metal Structure

The amount of solid-solubilized solute atoms in the aluminum alloy constituting a core material portion of the aluminum alloy brazing sheet according to the invention has a correlation with the electric resistivity. For this reason, in the invention, the amount of solid-solubilized solute atoms is controlled such that the electric resistivity of the core material portion at room temperature is within a range of 31-50n$\Omega$m, so that improvement of formability and brazeability is achieved. The above-indicated electric resistivity is realized by controlling, for example, the alloy composition of the core material, and the rate of strain in the hot clad-rolling process described later. In the case where the electric resistivity at room temperature is less than 31n$\Omega$m, the amount of solid-solubilized solute atoms is too small, so that the n-value is too low and desirable formability cannot be obtained. On the other hand, in the case where the electric resistivity at room temperature is more than 50n$\Omega$m, the amount of solid-solubilized solute atoms is excessively large, so that the core material fails to be subjected to recrystallization during heating for brazing and suffers from erosion by the filler material, resulting in difficulty to achieve desirable brazeability. The electric resistivity of the core material portion at room temperature is preferably 31-45n$\Omega$m, and more preferably 31-40n$\Omega$m.

Furthermore, to examine a state of dispersion of fine second phase particles at the core material portion of the brazing sheet, an area ratio of the second phase particles having a circle equivalent diameter of not more than 0.5 $\mu$m is defined as f (%), an average circle equivalent diameter of the second phase particles is defined as r ($\mu$m), and the dispersion ratio of the second phase particles is defined as f/r. According to the definitions, the dispersion ratio of the second phase particles in the core material portion is controlled to be within a range of 5-50%·$\mu$m$^{-1}$, so as to contribute to improvement of formability and brazeability. The above-indicated dispersion ratio is realized by controlling, for example, the alloy composition of the core material and the highest temperature in the hot clad-rolling process described later. In the case where the dispersion ratio of the second phase particles is less than 5%·$\mu$m$^{-1}$, a force to prevent a movement of a recrystallized grain boundary during heating for brazing is weak, so that the recrystallized grains in the core material portion are fine, and erosion by the filler material is caused, resulting in poor brazeability. On the other hand, in the case where the dispersion ratio of the second phase particles is more than 50%·$\mu$m$^{-1}$, lattice defects introduced by plastic deformation in the hot clad-rolling process form microbands so that the n-value is small, resulting in poor formability. The dispersion ratio of the second phase particles in the core material portion is preferably 5-40%·$\mu$m$^{-1}$, and more preferably 5-30%·$\mu$m$^{-1}$.

1-6. Properties

The work hardening exponent (n-value) contributes to improvement of formability, and varies depending on the amount of solid-solubilized solute elements in the core material and the state of dispersion of the fine second phase particles in the core material. Formability can be improved by controlling the work hardening exponent n-value, where a nominal strain in a uniaxial punch stretch forming test is within a range of 1%-2%, such that the n-value is not less than 0.010. In the case where the n-value is less than 0.010, the lattice defects introduced by the plastic deformation are not distributed uniformly, so that a degree of flatness of the rolled sheet is low, and sufficient formability cannot be obtained. The work hardening exponent n-value where the nominal strain is within the range of 1%-2% is preferably not less than 0.020, and more preferably not less than 0.030.

Furthermore, in the invention, a push-in depth when a penetration crack is generated in the punch stretch forming test is determined so as to contribute to improvement of formability. The push-in depth varies depending on the work hardening exponent (n-value). To measure the push-in depth, a sample 8 disposed between a dice 4 and a blank holder 6 is subjected to the punch stretch forming test using a round-head punch 2 having a diameter of 50 mm, as illustrated specifically in FIG. 1. The brazing sheet is controlled such that the push-in depth of the brazing sheet when the penetration crack is generated with the round-head punch 2 penetrating the sample 8 is not less than 10 mm. In the case where the push-in depth is less than 10 mm, the lattice defects introduced by the plastic deformation are not distributed uniformly, so that the degree of flatness of the rolled sheet is low, and desired formability cannot be easily obtained. In the punch stretch forming test using the round-head punch 2, the push-in depth when the penetration crack is generated is preferably not less than 12 mm, and more preferably not less than 14 mm.

In the invention, as described above, each of the aluminum alloys constituting the core material, the filler material and the intermediate layer material has the predetermined alloy composition. Furthermore, the aluminum alloy brazing sheet is formed to have the predetermined temper, metal structure and properties, so that excellent formability and brazeability are advantageously achieved.

2. Production of the Aluminum Alloy Brazing Sheet

The aluminum alloy brazing sheet for a heat exchanger according to the invention, which has the above-described alloy compositions, temper, metal structure and properties, is advantageously produced as described below.

2-1. Details of the Production Process

First, an Al base metal and Al matrix alloy are melted in a melting furnace, and components of a molten metal are adjusted so as to obtain a core alloy, a first filler alloy, a second filler alloy and an intermediate layer alloy, each of which has the predetermined alloy composition according to the invention as described above (molten metal production process). Then, the molten metal whose components have been adjusted is subjected to the conventional semi-continuous casting process, so that an ingot or billet for each of the core material, the first and second filler materials and the intermediate layer material is produced (casting process). The obtained ingot for the core material may be subjected to the conventional homogenization treatment. However, it is completely acceptable not to subject the ingot for the core material to a homogenization treatment, as in the case of the ingots for the first and second filler materials and the ingot for the intermediate layer material. Subsequently, the ingots for the core material, the first and second filler materials and the intermediate layer material are subjected to a surface-machining process. After that, in consideration of the thickness of the ingot for the core material, the ingots for the first and second filler materials and the intermediate layer material are subjected to hot rolling so as to produce rolled sheets which provide the first and second filler materials and the intermediate layer material (hot rolling process of the filler materials and the intermediate layer material). The obtained rolled sheets of the first and second filler materials and the intermediate layer material are stacked onto the ingot for the core material so as to provide a three- or four-layered material (layered product) (stacking process), and the layered material is heated and subjected to hot clad-rolling (hot clad-rolling process). Meanwhile, the three-layered product has a structure wherein the rolled sheets of the first filler material and the second filler material are disposed on the opposite sides of the ingot for the core material, and the four-layered product has a structure wherein the intermediate layer material is disposed between the ingot for the core material and the rolled sheet of the second filler material in the three-layered product. Furthermore, in the hot clad-rolling process, a rate of strain of the sheet due to reduction of its thickness in each pass in a rolling stand and a temperature of the layered material during the rolling is controlled so as to produce a cladded sheet. Subsequently, after subjecting the cladded sheet to cold rolling (cold rolling process), the cold-rolled sheet is subjected to thermal refining by predetermined final annealing as necessary, so that a brazing sheet having the desired temper HXY is eventually obtained. In the case where X is 1 in the temper HXY, intermediate annealing during the cold rolling is performed as necessary, so that the desired brazing sheet having the temper H12-H16 is produced. In the case where X is 2, the predetermined final annealing is performed after the cold rolling, so that the desired brazing sheet having the temper H22-26 is produced.

In the above-described production process of the brazing sheet, the hot clad-rolling process of the layered product can be performed in separate operations of rough hot rolling and finish hot rolling. In the rough hot rolling operation, a reverse rolling mill is used. In the method using the reverse rolling mill, a rolling process is performed by subjecting the layered product to a plurality of passes between the rolls. A distance between the rolls is reduced as the layered product is subjected to the plurality of passes, so that the thickness of the layered product is accordingly reduced. The process is performed as a reverse rolling method wherein rolling directions of the rolls of the odd-numbered passes and even-numbered passes are opposite to each other, so that the rolling operation is alternately performed in the opposite directions. That is, the rolling direction of the rolls is reversed in each pass of the clad rolling such that the rolling directions of the rolls in the odd-numbered passes and the even-numbered passes of the rolling are reversed with respect to each other, so that the rolling operation progresses bidirectionally. Following the rough hot rolling, the finish hot rolling is performed. In the finish hot rolling operation, a tandem rolling mill which has a plurality of stands is used. In the tandem rolling mill, a plurality of stands each of which consists of a rolling mill having a pair of rolls are disposed in series with each other. The sheet is subjected to the rolling in one direction with its thickness being reduced, and is wound up in the form of a coil after the sheet is passed through the final stand. The number of stands is preferably 2 to 5. Here, a one-way rolling is defined as one pass in the above-described reverse rolling mill, and a rolling by one pair of rolls is defined as one pass in the above-described tandem rolling mill.

To obtain the metal structure of the core material defined in the invention, it is necessary to control solid-solubilization and precipitation behavior of the core material in the above-described hot clad-rolling. In the invention, the rate of strain of the sheet due to reduction of its thickness in each pass (rolling stand) in the rolling mill and the highest temperature of the layered material are controlled as follows.

2-2. Rate of Strain of the Sheet Due to Reduction of its Thickness in Each Pass in the Hot Clad-Rolling Process The highest rate of strain of the sheet due to reduction of its thickness in each pass (rolling stand) in the hot clad-rolling process in the rolling mill is controlled so as to contribute to improvement of formability, so that the highest rate of strain of the sheet due to reduction of its thickness in each pass is held within $0.5\text{-}10\text{s}^{-1}$. In the case where the highest rate of strain is less than $0.5\text{s}^{-1}$, the time required for the rolling process is too long and productivity is deteriorated, so that the process is industrially disadvantageous. On the other hand, in the case where the highest rate of strain is more than $10\text{s}^{-1}$, the amount of lattice defects introduced by the rolling is excessively large and the second phase particles are excessively precipitated during the rolling or between the passes, so that the amount of solid-solubilized solute atoms is too small and the n-value is small, resulting in poor formability. The highest rate of strain of the sheet due to reduction of its thickness in each pass is preferably $0.5\text{-}9\text{s}^{-1}$, and more preferably $0.5\text{-}8\text{s}^{-1}$.

The rate of strain of the sheet due to reduction of its thickness, $d\varepsilon/dt$ ($\text{s}^{-1}$), in each pass in the rolling process is calculated as follows. A contact length of the roll and the sheet: L(mm) is approximated as $L \approx [R \cdot (h1-h2)]^{1/2}$, and the time T(s) required for reduction of the thickness from h1 to h2 is approximated as $T \approx L/V$, where a thickness of a sheet before rolling in a certain pass is represented as h1 (mm), a thickness of the sheet after the rolling is represented as h2 (mm), a rate of pass of the sheet is represented as $V(\text{mm} \cdot \text{s}^{-1})$, and a radius of the roll is represented as R(mm). Accordingly, the rate of strain is represented by the following equation:

$$d\varepsilon/dt \approx [(h1-h2)/h1]/T$$
$$= [V/h] \cdot [(h1-h2)/R]^{1/2}$$

2-3. Highest Temperature of the Layered Material During the Hot Clad-Rolling

Furthermore, in the invention, the highest temperature of the layered material in the hot clad-rolling to obtain the desired brazing sheet is controlled so as to contribute to improvement of formability. The highest temperature of the layered material during the hot clad-rolling is determined within a range of 400-510° C. In the case where the highest temperature of the layered material is lower than 400° C., the second phase particles in the core material portion are formed finely and densely, and the dispersion ratio of the second phase particles is excessively high, so that it is difficult to obtain desired formability. On the other hand, in the case where the highest temperature of the layered material is higher than 510° C., the second phase particles in the core material portion are subjected to the Ostwald growth, and the dispersion ratio of the second phase particles is too low, so that it is impossible to obtain effective brazeability. The highest temperature of the layered material during the hot clad-rolling is preferably 400-490° C., and more preferably 400-470° C.

Examples

To clarify the present invention more specifically, some examples according to the present invention will be described. It is to be understood that the invention is by no means limited by details of the illustrated examples, but may be embodied with various changes, modifications and improvements which are not described herein, and which may occur to those skilled in the art, without departing from the spirit of the invention.

1. Production of the Three-Layered Cladded Brazing Sheet

Various filler alloys 1, 2 and core alloys having aluminum alloy compositions shown in the following Tables 1, 2 and 5 were produced by melting, and then subjected to casting by the conventional semi-continuous casting method so as to obtain various ingots for filler materials 1, 2 and core materials. Subsequently, each of the ingots was subjected to surface-machining, and then the ingots for filler materials 1, 2 were subjected to hot-rolling by the reverse rough rolling process so that their thickness was enough to achieve a predetermined clad ratio, whereby various rolled sheets of filler materials 1, 2 were produced. Then the rolled sheets of filler materials 1, 2 obtained by the hot rolling were bonded on the opposite sides of the ingot for the core material to prepare layered materials. The layered materials were heated, and then subjected to the hot clad-rolling process which includes the reverse rough rolling process and the tandem finish rolling process under the conditions shown in the following Tables 3, 4 and 6, so that cladded materials were produced. Furthermore, after the above-described hot clad-rolling, the cladded materials were subjected to cold rolling and annealing, so that various aluminum alloy brazing sheets with a final thickness of 1.5 mm or 0.07 mm and a temper shown in the following Tables 3, 4 and 6 were produced and used as samples. With respect to the above-described annealing, in Examples 1-35, 37-42, 46 and Comparative Examples 1-23, 25, cold rolling and intermediate annealing during the cold rolling were performed, while in Examples 43, 44 and Comparative Examples 24, 26, 28, only final annealing was performed. In Examples 45, 47, intermediate annealing during cold rolling and final annealing after the cold rolling were performed. In Example 36 and Comparative Example 27, only the cold rolling was performed and the annealing was not performed. Each of the clad ratios of the two (first and second) filler materials was set to be 10%.

TABLE 1

| Example No. | Alloy composition of filler material 1 (mass %) | | | | Alloy composition of core material (mass %) | | | | | Alloy composition of filler material 2 (mass %) | | | |
|---|---|---|---|---|---|---|---|---|---|---|---|---|---|
| | Si | Fe | Other components | Al | Si | Fe | Mn | Other components | Al | Si + Fe | Si | Fe | Other components | Al |
| 1 | 4.5 | 0.5 | — | balance | 0.2 | 0.3 | 1.6 | — | balance | 0.5 | 9.5 | 0.5 | — | balance |
| 2 | 9.5 | 0.5 | — | balance | 0.2 | 0.3 | 1.6 | — | balance | 0.5 | 9.5 | 0.5 | — | balance |
| 3 | 13.0 | 0.5 | — | balance | 0.2 | 0.3 | 1.6 | — | balance | 0.5 | 9.5 | 0.5 | — | balance |
| 4 | 9.5 | 0.05 | — | balance | 0.2 | 0.3 | 1.6 | — | balance | 0.5 | 9.5 | 0.5 | — | balance |
| 5 | 9.5 | 0.8 | — | balance | 0.2 | 0.3 | 1.6 | — | balance | 0.5 | 9.5 | 0.5 | — | balance |
| 6 | 9.5 | 0.5 | Cu: 0.05 | balance | 0.2 | 0.3 | 1.6 | — | balance | 0.5 | 9.5 | 0.5 | — | balance |
| 7 | 9.5 | 0.5 | Cu: 1.0 | balance | 0.2 | 0.3 | 1.6 | — | balance | 0.5 | 9.5 | 0.5 | Zn: 3.0 | balance |
| 8 | 9.5 | 0.5 | Cu: 1.5 | balance | 0.2 | 0.3 | 1.6 | — | balance | 0.5 | 9.5 | 0.5 | — | balance |
| 9 | 9.5 | 0.5 | Zn: 0.05 | balance | 0.2 | 0.3 | 1.6 | — | balance | 0.5 | 9.5 | 0.5 | — | balance |
| 10 | 9.5 | 0.5 | Zn: 5.0 | balance | 0.2 | 0.3 | 1.6 | — | balance | 0.5 | 9.5 | 0.5 | — | balance |
| 11 | 9.5 | 0.5 | Na: 0.003 | balance | 0.2 | 0.3 | 1.6 | — | balance | 0.5 | 9.5 | 0.5 | — | balance |
| 12 | 9.5 | 0.5 | Na: 0.03 | balance | 0.2 | 0.3 | 1.6 | — | balance | 0.5 | 9.5 | 0.5 | Sr: 0.03 | balance |
| 13 | 9.5 | 0.5 | Na: 0.05 | balance | 0.2 | 0.3 | 1.6 | — | balance | 0.5 | 9.5 | 0.5 | — | balance |
| 14 | 9.5 | 0.5 | Sr: 0.003 | balance | 0.2 | 0.3 | 1.6 | — | balance | 0.5 | 9.5 | 0.5 | — | balance |
| 15 | 9.5 | 0.5 | Sr: 0.05 | balance | 0.2 | 0.3 | 1.6 | — | balance | 0.5 | 9.5 | 0.5 | — | balance |
| 16 | 9.5 | 0.5 | — | balance | 0.05 | 0.3 | 1.6 | — | balance | 0.35 | 9.5 | 0.5 | — | balance |
| 17 | 9.5 | 0.5 | — | balance | 0.6 | 0.3 | 1.6 | — | balance | 0.9 | 9.5 | 0.5 | — | balance |
| 18 | 9.5 | 0.5 | — | balance | 0.2 | 0.05 | 1.6 | — | balance | 0.25 | 9.5 | 0.5 | — | balance |
| 19 | 9.5 | 0.5 | — | balance | 0.2 | 0.7 | 1.6 | — | balance | 0.9 | 9.5 | 0.5 | — | balance |
| 20 | 9.5 | 0.5 | — | balance | 0.2 | 0.3 | 0.6 | — | balance | 0.5 | 9.5 | 0.5 | — | balance |
| 21 | 9.5 | 0.5 | — | balance | 0.2 | 0.3 | 2.0 | — | balance | 0.5 | 9.5 | 0.5 | — | balance |
| 22 | 9.5 | 0.5 | — | balance | 0.2 | 0.3 | 1.6 | Cu: 0.05 | balance | 0.5 | 9.5 | 0.5 | — | balance |
| 23 | 9.5 | 0.5 | — | balance | 0.2 | 0.3 | 1.6 | Cu: 0.6 | balance | 0.5 | 9.5 | 0.5 | — | balance |
| 24 | 9.5 | 0.5 | — | balance | 0.2 | 0.3 | 1.6 | Cu: 1.0 | balance | 0.5 | 9.5 | 0.5 | — | balance |

TABLE 2

| Example No. | Alloy composition of filler material 1 (mass %) | | | | Alloy composition of core material (mass %) | | | | | | Alloy composition of filler material 2 (mass %) | | | | |
|---|---|---|---|---|---|---|---|---|---|---|---|---|---|---|---|
| | Si | Fe | Other components | Al | Si | Fe | Mn | Other components | Al | Si + Fe | Si | Fe | Other components | Al | |
| 25 | 9.5 | 0.5 | — | balance | 0.2 | 0.3 | 1.6 | Zn: 0.05 | balance | 0.5 | 9.5 | 0.5 | — | balance | |
| 26 | 9.5 | 0.5 | — | balance | 0.2 | 0.3 | 1.6 | Zn: 2.0 | balance | 0.5 | 9.5 | 0.5 | — | balance | |
| 27 | 9.5 | 0.5 | — | balance | 0.2 | 0.3 | 1.6 | Zn: 3.0 | balance | 0.5 | 9.5 | 0.5 | — | balance | |
| 28 | 9.5 | 0.5 | — | balance | 0.2 | 0.3 | 1.6 | Ti: 0.05 | balance | 0.5 | 9.5 | 0.5 | — | balance | |
| 29 | 9.5 | 0.5 | — | balance | 0.2 | 0.3 | 1.6 | Ti: 0.15 | balance | 0.5 | 9.5 | 0.5 | — | balance | |
| 30 | 9.5 | 0.5 | — | balance | 0.2 | 0.3 | 1.6 | Ti: 0.3 | balance | 0.5 | 9.5 | 0.5 | — | balance | |
| 31 | 9.5 | 0.5 | — | balance | 0.2 | 0.3 | 1.6 | Zr: 0.05 | balance | 0.5 | 9.5 | 0.5 | — | balance | |
| 32 | 9.5 | 0.5 | — | balance | 0.2 | 0.3 | 1.6 | Zr: 0.15 | balance | 0.5 | 9.5 | 0.5 | — | balance | |
| 33 | 9.5 | 0.5 | — | balance | 0.2 | 0.3 | 1.6 | Zr: 0.3 | balance | 0.5 | 9.5 | 0.5 | — | balance | |
| 34 | 9.5 | 0.5 | — | balance | 0.2 | 0.3 | 1.6 | Cr: 0.05 | balance | 0.5 | 9.5 | 0.5 | — | balance | |
| 35 | 9.5 | 0.5 | — | balance | 0.2 | 0.3 | 1.6 | Cr: 0.15 | balance | 0.5 | 9.5 | 0.5 | — | balance | |
| 36 | 9.5 | 0.5 | — | balance | 0.2 | 0.3 | 1.6 | Cr: 0.3 | balance | 0.5 | 9.5 | 0.5 | — | balance | |
| 37 | 9.5 | 0.5 | — | balance | 0.2 | 0.3 | 1.6 | — | balance | 0.5 | 9.5 | 0.5 | — | balance | |
| 38 | 9.5 | 0.5 | — | balance | 0.2 | 0.3 | 1.6 | — | balance | 0.5 | 9.5 | 0.5 | — | balance | |
| 39 | 9.5 | 0.5 | — | balance | 0.2 | 0.3 | 1.6 | — | balance | 0.5 | 9.5 | 0.5 | — | balance | |
| 40 | 9.5 | 0.5 | — | balance | 0.2 | 0.3 | 1.6 | — | balance | 0.5 | 9.5 | 0.5 | — | balance | |
| 41 | 9.5 | 0.5 | — | balance | 0.2 | 0.3 | 1.6 | — | balance | 0.5 | 9.5 | 0.5 | — | balance | |
| 42 | 9.5 | 0.5 | — | balance | 0.2 | 0.3 | 1.6 | — | balance | 0.5 | 9.5 | 0.5 | — | balance | |
| 43 | 9.5 | 0.5 | — | balance | 0.2 | 0.3 | 1.6 | — | balance | 0.5 | 9.5 | 0.5 | — | balance | |
| 44 | 9.5 | 0.5 | — | balance | 0.2 | 0.3 | 1.6 | — | balance | 0.5 | 9.5 | 0.5 | — | balance | |
| 45 | 9.5 | 0.5 | — | balance | 0.2 | 0.3 | 1.6 | — | balance | 0.5 | 9.5 | 0.5 | — | balance | |
| 46 | 9.5 | 0.5 | — | balance | 0.2 | 0.3 | 1.6 | Zn: 1.5 | balance | 0.5 | 9.5 | 0.5 | — | balance | |
| 47 | 9.5 | 0.5 | — | balance | 0.2 | 0.3 | 1.6 | Zn: 1.5 | balance | 0.5 | 9.5 | 0.5 | — | balance | |

TABLE 3

| | Hot clad-rolling | | | | |
|---|---|---|---|---|---|
| Example No. | Highest rate of strain ($s^{-1}$) | Highest temperature (° C.) | Temper | Thickness (mm) | Productivity |
| 1 | 8 | 450 | H14 | 1.5 | Good |
| 2 | 8 | 450 | H14 | 1.5 | Good |
| 3 | 8 | 450 | H14 | 1.5 | Good |
| 4 | 8 | 450 | H14 | 1.5 | Good |
| 5 | 8 | 450 | H14 | 1.5 | Good |
| 6 | 8 | 450 | H14 | 1.5 | Good |
| 7 | 8 | 450 | H14 | 1.5 | Good |
| 8 | 8 | 450 | H14 | 1.5 | Good |
| 9 | 8 | 450 | H14 | 1.5 | Good |
| 10 | 8 | 450 | H14 | 1.5 | Good |
| 11 | 8 | 450 | H14 | 1.5 | Good |
| 12 | 8 | 450 | H14 | 1.5 | Good |
| 13 | 8 | 450 | H14 | 1.5 | Good |
| 14 | 8 | 450 | H14 | 1.5 | Good |
| 15 | 8 | 450 | H14 | 1.5 | Good |
| 16 | 8 | 450 | H14 | 1.5 | Good |
| 17 | 8 | 450 | H14 | 1.5 | Good |
| 18 | 8 | 450 | H14 | 1.5 | Good |
| 19 | 8 | 450 | H14 | 1.5 | Good |
| 20 | 8 | 450 | H14 | 1.5 | Good |
| 21 | 8 | 450 | H14 | 1.5 | Good |
| 22 | 8 | 450 | H14 | 1.5 | Good |
| 23 | 8 | 450 | H14 | 1.5 | Good |
| 24 | 8 | 450 | H14 | 1.5 | Good |

TABLE 4

| | Hot clad-rolling | | | | |
|---|---|---|---|---|---|
| Example No. | Highest rate of strain ($s^{-1}$) | Highest temperature (° C.) | Temper | Thickness (mm) | Productivity |
| 25 | 8 | 450 | H14 | 1.5 | Good |
| 26 | 8 | 450 | H14 | 1.5 | Good |
| 27 | 8 | 450 | H14 | 1.5 | Good |
| 28 | 8 | 450 | H14 | 1.5 | Good |
| 29 | 8 | 450 | H14 | 1.5 | Good |
| 30 | 8 | 450 | H14 | 1.5 | Good |
| 31 | 8 | 450 | H14 | 1.5 | Good |
| 32 | 8 | 450 | H14 | 1.5 | Good |
| 33 | 8 | 450 | H14 | 1.5 | Good |
| 34 | 8 | 450 | H14 | 1.5 | Good |
| 35 | 8 | 450 | H14 | 1.5 | Good |
| 36 | 8 | 450 | H14 | 1.5 | Good |
| 37 | 0.5 | 450 | H14 | 1.5 | Good |
| 38 | 10 | 450 | H14 | 1.5 | Good |
| 39 | 8 | 400 | H14 | 1.5 | Good |
| 40 | 8 | 510 | H14 | 1.5 | Good |
| 41 | 8 | 450 | H12 | 1.5 | Good |
| 42 | 8 | 450 | H16 | 1.5 | Good |
| 43 | 8 | 450 | H22 | 1.5 | Good |
| 44 | 8 | 450 | H24 | 1.5 | Good |
| 45 | 8 | 450 | H26 | 1.5 | Good |
| 46 | 8 | 450 | H14 | 0.07 | Good |
| 47 | 8 | 450 | H24 | 0.07 | Good |

TABLE 5

| Comparative Example No. | Alloy composition of filler material 1 (mass %) | | | | Alloy composition of core material (mass %) | | | | | | Alloy composition of filler material 2 (mass %) | | | |
|---|---|---|---|---|---|---|---|---|---|---|---|---|---|---|
| | Si | Fe | Other components | Al | Si | Fe | Mn | Other components | Al | Si + Fe | Si | Fe | Other components | Al |
| 1 | 3.0 | 0.5 | — | balance | 0.2 | 0.3 | 1.6 | — | balance | 0.5 | 9.5 | 0.5 | — | balance |
| 2 | 15.0 | 0.5 | — | balance | 0.2 | 0.3 | 1.6 | — | balance | 0.5 | 9.5 | 0.5 | — | balance |
| 3 | 9.5 | 0.01 | — | balance | 0.2 | 0.3 | 1.6 | — | balance | 0.5 | 9.5 | 0.5 | — | balance |
| 4 | 9.5 | 1.0 | — | balance | 0.2 | 0.3 | 1.6 | — | balance | 0.5 | 9.5 | 0.5 | — | balance |
| 5 | 9.5 | 0.5 | Cu: 2.0 | balance | 0.2 | 0.3 | 1.6 | — | balance | 0.5 | 9.5 | 0.5 | — | balance |
| 6 | 9.5 | 0.5 | Zn: 6.0 | balance | 0.2 | 0.3 | 1.6 | — | balance | 0.5 | 9.5 | 0.5 | — | balance |
| 7 | 9.5 | 0.5 | Na: 0.10 | balance | 0.2 | 0.3 | 1.6 | — | balance | 0.5 | 9.5 | 0.5 | — | balance |
| 8 | 9.5 | 0.5 | Sr: 0.10 | balance | 0.2 | 0.3 | 1.6 | — | balance | 0.5 | 9.5 | 0.5 | — | balance |
| 9 | 9.5 | 0.5 | — | balance | 0.01 | 0.3 | 1.6 | — | balance | 0.3 | 9.5 | 0.5 | — | balance |
| 10 | 9.5 | 0.5 | — | balance | 0.8 | 0.3 | 1.6 | — | balance | 1.1 | 9.5 | 0.5 | — | balance |
| 11 | 9.5 | 0.5 | — | balance | 0.2 | 0.01 | 1.6 | — | balance | 0.2 | 9.5 | 0.5 | — | balance |
| 12 | 9.5 | 0.5 | — | balance | 0.2 | 1.0 | 1.6 | — | balance | 1.2 | 9.5 | 0.5 | — | balance |
| 13 | 9.5 | 0.5 | — | balance | 0.2 | 0.3 | 0.5 | — | balance | 0.5 | 9.5 | 0.5 | — | balance |
| 14 | 9.5 | 0.5 | — | balance | 0.2 | 0.3 | 2.2 | — | balance | 0.5 | 9.5 | 0.5 | — | balance |
| 15 | 9.5 | 0.5 | — | balance | 0.6 | 0.7 | 1.2 | — | balance | 1.3 | 9.5 | 0.5 | — | balance |
| 16 | 9.5 | 0.5 | — | balance | 0.2 | 0.3 | 1.6 | Cu: 1.2 | balance | 0.5 | 9.5 | 0.5 | — | balance |
| 17 | 9.5 | 0.5 | — | balance | 0.2 | 0.3 | 1.6 | Zn: 4.0 | balance | 0.5 | 9.5 | 0.5 | — | balance |
| 18 | 9.5 | 0.5 | — | balance | 0.2 | 0.3 | 1.6 | Ti: 0.4 | balance | 0.5 | 9.5 | 0.5 | — | balance |
| 19 | 9.5 | 0.5 | — | balance | 0.2 | 0.3 | 1.6 | Zr: 0.4 | balance | 0.5 | 9.5 | 0.5 | — | balance |
| 20 | 9.5 | 0.5 | — | balance | 0.2 | 0.3 | 1.6 | Cr: 0.4 | balance | 0.5 | 9.5 | 0.5 | — | balance |
| 21 | 9.5 | 0.5 | — | balance | 0.2 | 0.3 | 1.6 | — | balance | 0.5 | 9.5 | 0.5 | — | balance |
| 22 | 9.5 | 0.5 | — | balance | 0.2 | 0.3 | 1.6 | — | balance | 0.5 | 9.5 | 0.5 | — | balance |
| 23 | 9.5 | 0.5 | — | balance | 0.2 | 0.3 | 1.6 | — | balance | 0.5 | 9.5 | 0.5 | — | balance |
| 24 | 9.5 | 0.5 | — | balance | 0.2 | 0.3 | 1.6 | — | balance | 0.5 | 9.5 | 0.5 | — | balance |
| 25 | 9.5 | 0.5 | — | balance | 0.2 | 0.3 | 1.6 | — | balance | 0.5 | 9.5 | 0.5 | — | balance |
| 26 | 9.5 | 0.5 | — | balance | 0.2 | 0.3 | 1.6 | — | balance | 0.5 | 9.5 | 0.5 | — | balance |
| 27 | 9.5 | 0.5 | — | balance | 0.2 | 0.3 | 1.6 | — | balance | 0.5 | 9.5 | 0.5 | — | balance |
| 28 | 9.5 | 0.5 | — | balance | 0.2 | 0.3 | 1.6 | — | balance | 0.5 | 9.5 | 0.5 | — | balance |

TABLE 6

| Comparative Example No. | Hot clad-rolling | | Temper | Thickness (mm) | Productivity |
|---|---|---|---|---|---|
| | Highest rate of strain ($s^{-1}$) | Highest temperature (° C.) | | | |
| 1 | 8 | 450 | H14 | 1.5 | Good |
| 2 | 8 | 450 | H14 | 1.5 | Good |
| 3 | 8 | 450 | H14 | 1.5 | Good |
| 4 | 8 | 450 | H14 | 1.5 | Good |
| 5 | 8 | 450 | H14 | 1.5 | Good |
| 6 | 8 | 450 | H14 | 1.5 | Good |
| 7 | 8 | 450 | H14 | 1.5 | Good |
| 8 | 8 | 450 | H14 | 1.5 | Good |
| 9 | 8 | 450 | H14 | 1.5 | Good |
| 10 | 8 | 450 | H14 | 1.5 | Good |
| 11 | 8 | 450 | H14 | 1.5 | Good |
| 12 | 8 | 450 | H14 | 1.5 | Good |
| 13 | 8 | 450 | H14 | 1.5 | Good |
| 14 | 8 | 450 | — | — | Poor |
| 15 | 8 | 450 | H14 | 1.5 | Good |
| 16 | 8 | 450 | H14 | 1.5 | Good |
| 17 | 8 | 450 | H14 | 1.5 | Good |
| 18 | 8 | 450 | — | — | Poor |
| 19 | 8 | 450 | — | — | Poor |
| 20 | 8 | 450 | — | — | Poor |
| 21 | 11 | 450 | H14 | 1.5 | Good |
| 22 | 8 | 390 | H14 | 1.5 | Good |
| 23 | 8 | 520 | H14 | 1.5 | Good |
| 24 | 8 | 450 | O | 1.5 | Good |
| 25 | 8 | 450 | H11 | 1.5 | Good |
| 26 | 8 | 450 | H21 | 1.5 | Good |
| 27 | 8 | 450 | H18 | 1.5 | Good |
| 28 | 8 | 450 | H28 | 1.5 | Good |

In the above-indicated alloy compositions in Tables 1, 2 and 5, "—" means that the contents were smaller than the limit of detection by a spark source atomic emission spectrochemical analyzer, and "balance" means that it consists of Al and inevitable impurities.

With respect to each of the samples of the aluminum alloy brazing sheets produced as described above, their productivity was evaluated, and at the same time electric resistivity in a core portion of the brazing sheet, a dispersion ratio of the second phase particles in the core portion, a work hardening exponent (n-value), a push-in depth in the punch stretch forming test, formability, brazeability and corrosion resistance were measured. The methods of measurement and evaluation are described below. It is noted that "Poor" in the evaluation of productivity means that a sample of the brazing sheet could not be obtained.

(Electric Resistivity)

Samples of cores subjected to working and heat treatment under the same conditions as those for the brazing sheets (rolled sheets of core materials to which filler materials of the brazing sheets were not bonded) were prepared separately. With respect to the sample of the core, an electric resistance was measured in a thermostat chamber at 20° C. according to JIS-H-0505, and the electric resistivity was calculated.

(Dispersion Ratio of the Second Phase Particles in the Core Portion)

With respect to each sample, a microphotograph of the L-ST surface in a central part in the direction of the thickness of the sheet was taken by a field emission type scanning electron microscope (FE-SEM) with magnification of 20,000 times. Then, with respect to the second phase particles having a circle equivalent diameter of not more than 0.5 μm, an area ratio: f (%) and an average circle equivalent diameter: r (μm) were measured using an image analyzing software, so that the dispersion ratio (f/r) was calculated by dividing the area ratio by the average circle equivalent diameter. More specifically, the value of dispersion ratio was calculated with respect to 5 views per one sample, so that the arithmetical average of the values was defined as the dispersion ratio of the second phase particles in the core material portion of the desired brazing sheet.

(Work Hardening Exponent: n-Value)

First, each sample was subjected to a punch stretch forming test at room temperature according to JIS-Z-2241, so as to obtain a curve of nominal stress—nominal strain. Then, based on JIS-Z-2253, the work hardening exponent: n-value where the nominal strain is within a range of 1%-2% was calculated by a least-square method.

(Push-in Depth in the Punch Stretch Forming Test)

The push-in depth was evaluated by using a device for the punch stretch forming test indicated in FIG. 1. More specifically, a sample piece 8 was obtained by cutting each sample into a square shape having dimensions of width and length of 100 mm×100 mm, and the sample piece was held between a dice 4 and a blank holder 6 with a load of 40 kN. Then, a round-head punch 2 having a diameter of 50 mm was pushed into the sample piece at a rate of 120 mm/s, and was stopped at a moment a crack penetrating the total thickness of the sample piece 8 has appeared, so as to measure the push-in depth.

(Formability)

Figure 2:
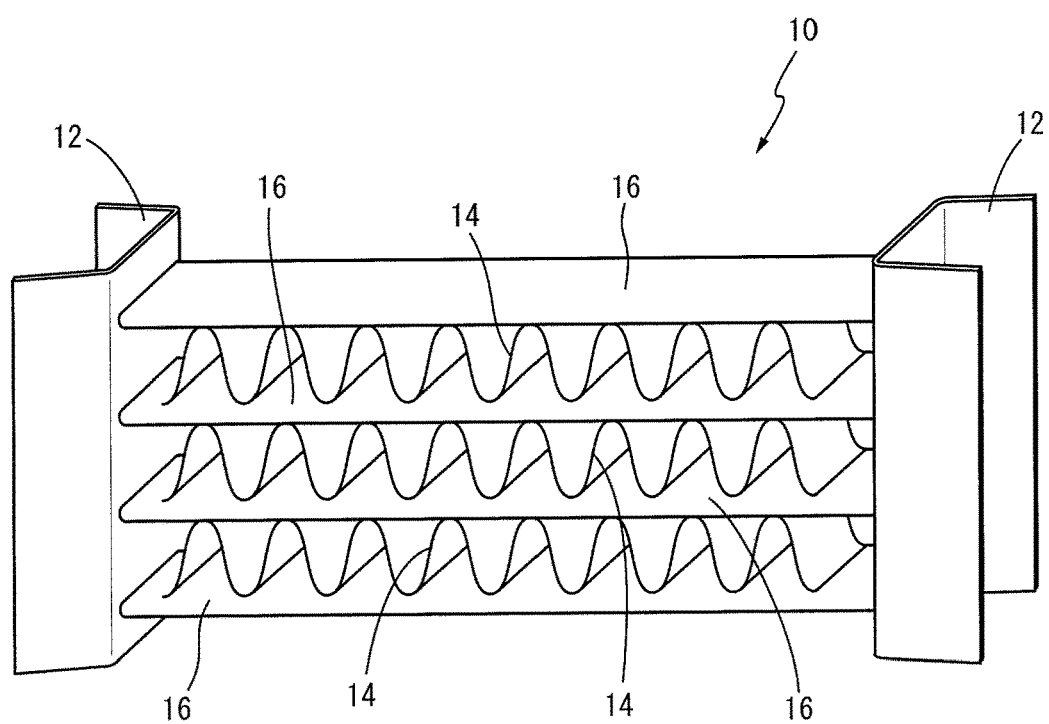
FIG. 2 is a schematic view of a miniature core assembly body for a test used for evaluation of formability, brazeability and corrosion resistance in Examples according to the present invention.

Each sample having the final thickness of 1.5 mm was cut into a piece having dimensions of width and length of 50 mm×50 mm, and the piece was subjected to 90° bending, and then subjected to punching to form slots for attachment of multi-port tubes, so as to form a plate 12 having a shape indicated in FIG. 2. Then, dimensions of the formed plate 12 were measured to evaluate the formability. With respect to the samples having the final thickness of 0.07 mm, each of the samples was cut into a piece having dimensions of width and length of 20 mm×300 mm, and subjected to corrugation working, so as to form a fin 14 having a corrugated shape indicated in FIG. 2. Then, dimensions of the formed fin 14 were measured to evaluate the formability. In the case where the dimensions of the formed plate and fin were within ranges of tolerance, the samples are evaluated as Good, while the dimensions after their formation were outside the ranges of tolerance, the samples are evaluated as Poor.

(Brazeability)

The brazeability was evaluated by using a miniature core assembly body 10 shown in FIG. 2. More specifically, the samples having the final thickness of 1.5 mm were used as the plates 12, and assembled with an extruded multi-port tube 16, which was formed of an Al alloy subjected to thermal spraying of 8 g/m$^2$ Zn, and with the fins 14 obtained by the sample of the Example 47, so as to form the miniature core assembly body 10. The samples having the final thickness of 0.07 mm were used as the fins 14, and assembled with the plates 12 obtained by the sample of the Example 2 and the extruded multi-port tube 16 subjected to thermal spraying of 8 g/m$^2$ Zn, so as to form the miniature core assembly body 10. Then, the miniature core assembly bodies 10 were immersed in a 5% fluoride-based flux suspension and dried, and subjected to heating for brazing. The heating for brazing was performed by heating the miniature core assembly bodies 10 in a nitrogen gas atmosphere furnace and holding them at 600° C. for 3 minutes. A cross-sectional micro-observation was performed with respect to the miniature core assembly bodies after heating for brazing. With respect to the samples having the final thickness of 1.5 mm, joints between the plate 12 and the extruded multi-port tube 16 were examined as to whether or not a fillet was formed, and with respect to the samples having the final thickness of 0.07 mm, the joint between the fin 14 and the extruded multi-port tube 16 were examined as to whether or not a fillet was formed, so as to evaluate the brazeability. In the case where the existence of fillet was recognized in the above-described joints after the brazing, the result is evaluated as Good, and in the case where the existence of fillet was not recognized, it is evaluated as Poor.

(Corrosion Resistance)

The brazed miniature core assembly bodies obtained by the above-described brazing test were subjected to the SWAAT (Sea Water Acetic Acid Test) according to the ASTM-G85 for 40 days, so that the corrosion state of the plates 12 and fins 14 was examined. As a result, in the case where erosion was caused and corrosion or exhaustion was significant, the result was evaluated as Poor. On the other hand, in the case where the corrosion or exhaustion was light, the result was evaluated as Good.

With respect to the samples of the Examples 1 to 47 shown in Tables 3 and 4, and the samples of the Comparative Examples 1-28 shown in Table 6, each test result or evaluation result is shown in the following Tables 7 and 8.

TABLE 7

| Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 1 | 40 | 30 | 0.030 | 14 | Good | Good | Good |
| 2 | 40 | 30 | 0.030 | 14 | Good | Good | Good |
| 3 | 40 | 30 | 0.030 | 14 | Good | Good | Good |
| 4 | 40 | 30 | 0.030 | 14 | Good | Good | Good |
| 5 | 40 | 30 | 0.030 | 14 | Good | Good | Good |
| 6 | 40 | 30 | 0.032 | 14 | Good | Good | Good |
| 7 | 40 | 30 | 0.032 | 14 | Good | Good | Good |
| 8 | 40 | 30 | 0.032 | 14 | Good | Good | Good |
| 9 | 40 | 30 | 0.032 | 14 | Good | Good | Good |
| 10 | 40 | 30 | 0.032 | 14 | Good | Good | Good |
| 11 | 40 | 30 | 0.030 | 14 | Good | Good | Good |
| 12 | 40 | 30 | 0.030 | 14 | Good | Good | Good |
| 13 | 40 | 30 | 0.030 | 14 | Good | Good | Good |
| 14 | 40 | 30 | 0.030 | 14 | Good | Good | Good |
| 15 | 40 | 30 | 0.030 | 14 | Good | Good | Good |
| 16 | 50 | 30 | 0.050 | 18 | Good | Good | Good |
| 17 | 31 | 30 | 0.010 | 10 | Good | Good | Good |
| 18 | 50 | 30 | 0.050 | 18 | Good | Good | Good |

TABLE 7-continued

| Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 19 | 31 | 30 | 0.010 | 10 | Good | Good | Good |
| 20 | 31 | 30 | 0.010 | 10 | Good | Good | Good |
| 21 | 50 | 30 | 0.050 | 18 | Good | Good | Good |
| 22 | 41 | 30 | 0.032 | 14 | Good | Good | Good |
| 23 | 43 | 30 | 0.036 | 15 | Good | Good | Good |
| 24 | 45 | 30 | 0.040 | 16 | Good | Good | Good |
| 25 | 41 | 30 | 0.032 | 14 | Good | Good | Good |
| 26 | 43 | 30 | 0.036 | 15 | Good | Good | Good |
| 27 | 45 | 30 | 0.040 | 16 | Good | Good | Good |
| 28 | 41 | 30 | 0.032 | 14 | Good | Good | Good |
| 29 | 41 | 30 | 0.032 | 14 | Good | Good | Good |
| 30 | 41 | 30 | 0.032 | 14 | Good | Good | Good |
| 31 | 41 | 30 | 0.032 | 14 | Good | Good | Good |
| 32 | 41 | 30 | 0.032 | 14 | Good | Good | Good |
| 33 | 41 | 30 | 0.032 | 14 | Good | Good | Good |
| 34 | 41 | 30 | 0.032 | 14 | Good | Good | Good |
| 35 | 41 | 30 | 0.032 | 14 | Good | Good | Good |
| 36 | 41 | 30 | 0.032 | 14 | Good | Good | Good |
| 37 | 50 | 30 | 0.050 | 18 | Good | Good | Good |
| 38 | 31 | 30 | 0.010 | 10 | Good | Good | Good |
| 39 | 40 | 50 | 0.010 | 10 | Good | Good | Good |
| 40 | 40 | 5 | 0.050 | 18 | Good | Good | Good |
| 41 | 40 | 30 | 0.035 | 15 | Good | Good | Good |
| 42 | 40 | 30 | 0.025 | 13 | Good | Good | Good |
| 43 | 40 | 30 | 0.050 | 18 | Good | Good | Good |
| 44 | 40 | 30 | 0.040 | 16 | Good | Good | Good |
| 45 | 40 | 30 | 0.030 | 14 | Good | Good | Good |
| 46 | 43 | 30 | 0.030 | 10 | Good | Good | Good |
| 47 | 43 | 30 | 0.040 | 11 | Good | Good | Good |

TABLE 8

| Comparative Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 1 | 40 | 30 | 0.030 | 14 | Good | Poor | Poor |
| 2 | 40 | 30 | 0.030 | 14 | Good | Poor | Poor |
| 3 | 40 | 30 | 0.030 | 14 | Good | Poor | Poor |
| 4 | 40 | 30 | 0.030 | 14 | Good | Good | Poor |
| 5 | 40 | 30 | 0.030 | 14 | Good | Good | Poor |
| 6 | 40 | 30 | 0.030 | 14 | Good | Good | Poor |
| 7 | 40 | 30 | 0.030 | 14 | Good | Poor | Poor |
| 8 | 40 | 30 | 0.030 | 14 | Good | Poor | Poor |
| 9 | 52 | 30 | 0.054 | 19 | Good | Poor | Poor |
| 10 | 29 | 30 | 0.008 | 9 | Poor | Poor | Poor |
| 11 | 52 | 30 | 0.054 | 19 | Good | Poor | Poor |
| 12 | 29 | 30 | 0.008 | 9 | Poor | Poor | Poor |
| 13 | 29 | 30 | 0.008 | 9 | Poor | Poor | Poor |
| 14 | — | — | — | — | — | — | — |
| 15 | 29 | 30 | 0.008 | 9 | Poor | Poor | Poor |
| 16 | 46 | 30 | 0.042 | 16 | Good | Good | Poor |
| 17 | 46 | 30 | 0.042 | 16 | Good | Good | Poor |
| 18 | — | — | — | — | — | — | — |
| 19 | — | — | — | — | — | — | — |
| 20 | — | — | — | — | — | — | — |
| 21 | 29 | 30 | 0.008 | 9 | Poor | Poor | Poor |
| 22 | 40 | 51 | 0.008 | 9 | Poor | Poor | Poor |
| 23 | 40 | 4 | 0.052 | 18 | Good | Poor | Poor |
| 24 | 40 | 30 | 0.060 | 20 | Good | Poor | Poor |
| 25 | 40 | 30 | 0.038 | 16 | Good | Poor | Poor |
| 26 | 40 | 30 | 0.053 | 19 | Good | Poor | Poor |
| 27 | 40 | 30 | 0.020 | 12 | Good | Poor | Poor |
| 28 | 40 | 30 | 0.025 | 13 | Good | Poor | Poor |

As is apparent from the results shown in the above-indicated Table 7, in the samples of the Examples 1-47, the alloy compositions of the core materials and the filler materials were within the range defined in the invention, and the metal structures and properties were also within the range defined in the invention. Furthermore, as is apparent from Tables 3 and 4, also the production conditions satisfied the conditions defined in the invention. For this reason, the samples enjoyed desirable productivity, and also excellent formability, brazeability and corrosion resistance.

In contrast, the Comparative Examples 1-28 suffered from various problems as shown in the above-indicated Table 8.

That is to say, in the samples of the Comparative Examples 1-4, as is shown in Table 5, the alloy compositions of the filler materials were outside the range defined in the invention, so that they had various problems. More specifically, in the Comparative Example 1, the filler material contained an insufficient amount of Si and had an insufficient amount of molten filler material, resulting in unsatisfactory brazeability. As a result, the joining portion was subjected to corrosion and penetration, so that also the corrosion resistance was unsatisfactory. In the Comparative Example 2, the filler material contained an excessively large amount of Si, thereby causing erosion by the filler material, resulting in unsatisfactory brazeability. As a result, the joining portion was subjected to corrosion and penetration, so that also the corrosion resistance was unsatisfactory. Furthermore, in the Comparative Example 3, the filler material contained an insufficient amount of Fe, thereby causing deterioration of the fluidity of the filler material, resulting in unsatisfactory brazeability. As a result, the joining portion was subjected to corrosion and penetration, so that also the corrosion resistance was unsatisfactory. In the Comparative Example 4, the filler material contained an excessively large amount of Fe, thereby causing an increase of the self-corrosion rate, resulting in unsatisfactory corrosion resistance.

In the Comparative Example 5, the filler material contained an excessively large amount of Cu, thereby causing an increase of the self-corrosion rate, resulting in unsatisfactory corrosion resistance. In the Comparative Example 6, the filler material contained an excessively large amount of Zn, thereby causing an increase of the corrosion rate of the fillet, resulting in unsatisfactory corrosion resistance. Furthermore, in the Comparative Example 7, the filler material contained an excessively large amount of Na, thereby causing deterioration of the fluidity of the filler material, resulting in unsatisfactory brazeability. As a result, the joining portion was subjected to corrosion and penetration, so that also the corrosion resistance was unsatisfactory. In addition, in the Comparative Example 8, the filler material contained an excessively large amount of Sr, thereby causing deterioration of the fluidity of the filler material, resulting in unsatisfactory brazeability. As a result, the joining portion was subjected to corrosion and penetration, so that also the corrosion resistance was unsatisfactory.

Also in the Comparative Examples 9-20, as is shown in Table 5, since the alloy compositions of the core materials were outside the range defined in the invention, the results were as follows. That is to say, in the Comparative Example 9, the core material contained an insufficient amount of Si, thereby causing erosion by the filler material, resulting in unsatisfactory brazeability. As a result, the joining portion was subjected to corrosion and penetration, so that also the corrosion resistance was unsatisfactory. In the Comparative Example 10, the core material contained an excessively large amount of Si and the n-value was small, resulting in unsatisfactory formability. As a result, no fillet was formed and also the brazeability was unsatisfactory, so that the joining portion was subjected to corrosion and penetration and further the corrosion resistance was unsatisfactory. In the Comparative Example 11, the core material contained an insufficient amount of Fe, thereby causing erosion by the filler material, resulting in unsatisfactory brazeability. As a result, the joining portion was subjected to corrosion and penetration, so that also the corrosion resistance was unsatisfactory. In the Comparative Example 12, the core material contained an excessively large amount of Fe and the n-value was small, resulting in unsatisfactory formability. As a result, no fillet was formed and also the brazeability was unsatisfactory, so that the joining portion was subjected to corrosion and penetration and further the corrosion resistance was unsatisfactory. In the Comparative Example 13, the core material contained an insufficient amount of Mn and the n-value was small, resulting in unsatisfactory formability. As a result, no fillet was formed and also the brazeability was unsatisfactory, so that the joining portion was subjected to corrosion and penetration and further the corrosion resistance was unsatisfactory. In the Comparative Example 14, the core material contained an excessively large amount of Mn, thereby causing breakage of the sheet during the cold rolling, so that a brazing sheet could not be produced.

In the Comparative Example 15, the total content of Si and Fe in the core material exceeded the content of Mn and the n-value was small, resulting in unsatisfactory formability. As a result, no fillet was formed and also the brazeability was unsatisfactory, so that the joining portion was subjected to corrosion and penetration and further the corrosion resistance was unsatisfactory. In the Comparative Example 16, the core material contained an excessively large amount of Cu, thereby causing an increase of the self-corrosion rate, resulting in unsatisfactory corrosion resistance. In the Comparative Example 17, the core material contained an excessively large amount of Zn, thereby causing an increase of the self-corrosion rate, resulting in unsatisfactory corrosion resistance. In the Comparative Examples 18-20, the core material contained excessive amounts of Ti, Zr and Cr, respectively, so that breakage was caused in the sheet during the cold rolling and a brazing sheet could not be produced.

Furthermore, in the Comparative Examples 21-28, the production conditions of the samples were outside the conditions defined in the invention as shown in above-indicated Table 6, so that the results were as follows. That is to say, in the Comparative Example 21, the highest rate of strain in the hot clad-rolling process was excessively high and the n-value was small, resulting in unsatisfactory formability. As a result, no fillet was formed, and also the brazeability was unsatisfactory, so that the joining portion was subjected to corrosion and penetration and further the corrosion resistance was unsatisfactory. In the Comparative Example 22, the highest temperature during the hot clad-rolling process was too low and the n-value was small, resulting in unsatisfactory formability. As a result, no fillet was formed, and also the brazeability was unsatisfactory, so that the joining portion was subjected to corrosion and penetration and further the corrosion resistance was unsatisfactory. In the Comparative Example 23, the highest temperature during the hot clad-rolling process was excessively high, so that erosion by the filler material was caused, resulting in unsatisfactory brazeability. As a result, the joining portion was subjected to corrosion and penetration and further the corrosion resistance was unsatisfactory.

In addition, in each of the brazing sheets of the Comparative Examples 24-28, the temper designations were 0, H11, H21, H18 and H28, respectively, so that erosion by the filler material was caused, resulting in unsatisfactory brazeability in each sheet. As a result, the joining portion was subjected to corrosion and penetration and further the corrosion resistance was unsatisfactory.

2. Production of the Four-Layered Cladded Brazing Sheet

According to the conventional semi-continuous casting process, various filler alloys 1, 2, core alloys and intermediate layer alloys having aluminum alloy compositions shown in the following Tables 9, 10 and 13 were produced so as to obtain various ingots for filler materials 1, 2, core material and intermediate layer material. Subsequently, each of the ingots was subjected to surface-machining, and then the ingots for the filler materials 1, 2 and the intermediate layer material were subjected to hot rolling by the reverse rough rolling process such that their thickness was enough to achieve a predetermined clad ratio, whereby various rolled sheets of the filler materials 1, 2 and the intermediate layer material were produced.

The above-described rolled sheets of the filler materials 1, 2 and the intermediate layer material were stacked together and bonded on the opposite surfaces of the above-described ingot for the core material, such that the layered product had four layers, that is to say, the rolled sheet of the filler material 1 was stacked on one side of the ingot for the core material, while the rolled sheet of the filler material 2 and the intermediate layer material were stacked successively on the other side of the ingot for the core material. Each of the obtained layered material was heated, and then subjected to the hot clad-rolling process which includes the reverse rough rolling process and the tandem finish rolling process under the conditions shown in the following Tables 11, 12 and 14, so that cladded materials were produced. Furthermore, after the above-described hot clad-rolling, the cladded materials were subjected to the cold rolling and annealing, so that various aluminum alloy brazing sheets with a final thickness of 1.5 mm and a temper shown in the following Tables 11, 12 and 14 were obtained and used as samples. With respect to the above-described annealing, in Examples 48-82, 84-98 and Comparative Examples 29-57, 59, the cold rolling and the intermediate annealing during the cold rolling were performed, while in Examples 99, 100 and Comparative Examples 58, 60, 62, only the final annealing was performed. In Examples 101, the intermediate annealing during cold rolling and the final annealing after the cold rolling were performed. In Example 83 and Comparative Example 61, only the cold rolling was performed but the annealing was not performed. Each of the clad ratios of the filler material 1, filler material 2 and the intermediate layer material was set to be 10%.

TABLE 9

| Example No. | Alloy composition of filler material 1 (mass %) | | | | Alloy composition of core material (mass %) | | | | | Si + Fe |
|---|---|---|---|---|---|---|---|---|---|---|
| | Si | Fe | Other components | Al | Si | Fe | Mn | Other components | Al | |
| 48 | 4.5 | 0.5 | — | balance | 0.2 | 0.3 | 1.6 | — | balance | 0.5 |
| 49 | 9.5 | 0.5 | — | balance | 0.2 | 0.3 | 1.6 | — | balance | 0.5 |
| 50 | 13.0 | 0.5 | — | balance | 0.2 | 0.3 | 1.6 | — | balance | 0.5 |
| 51 | 9.5 | 0.05 | — | balance | 0.2 | 0.3 | 1.6 | — | balance | 0.5 |
| 52 | 9.5 | 0.8 | — | balance | 0.2 | 0.3 | 1.6 | — | balance | 0.5 |
| 53 | 9.5 | 0.5 | Cu: 0.05 | balance | 0.2 | 0.3 | 1.6 | — | balance | 0.5 |
| 54 | 9.5 | 0.5 | Cu: 1.0 | balance | 0.2 | 0.3 | 1.6 | — | balance | 0.5 |
| 55 | 9.5 | 0.5 | Cu: 1.5 | balance | 0.2 | 0.3 | 1.6 | — | balance | 0.5 |
| 56 | 9.5 | 0.5 | Zn: 0.05 | balance | 0.2 | 0.3 | 1.6 | — | balance | 0.5 |
| 57 | 9.5 | 0.5 | Zn: 5.0 | balance | 0.2 | 0.3 | 1.6 | — | balance | 0.5 |
| 58 | 9.5 | 0.5 | Na: 0.003 | balance | 0.2 | 0.3 | 1.6 | — | balance | 0.5 |
| 59 | 9.5 | 0.5 | Na: 0.03 | balance | 0.2 | 0.3 | 1.6 | — | balance | 0.5 |
| 60 | 9.5 | 0.5 | Na: 0.05 | balance | 0.2 | 0.3 | 1.6 | — | balance | 0.5 |
| 61 | 9.5 | 0.5 | Sr: 0.003 | balance | 0.2 | 0.3 | 1.6 | — | balance | 0.5 |
| 62 | 9.5 | 0.5 | Sr: 0.05 | balance | 0.2 | 0.3 | 1.6 | — | balance | 0.5 |
| 63 | 9.5 | 0.5 | — | balance | 0.05 | 0.3 | 1.6 | — | balance | 0.35 |
| 64 | 9.5 | 0.5 | — | balance | 0.6 | 0.3 | 1.6 | — | balance | 0.9 |
| 65 | 9.5 | 0.5 | — | balance | 0.2 | 0.05 | 1.6 | — | balance | 0.25 |
| 66 | 9.5 | 0.5 | — | balance | 0.2 | 0.7 | 1.6 | — | balance | 0.9 |
| 67 | 9.5 | 0.5 | — | balance | 0.2 | 0.3 | 0.6 | — | balance | 0.5 |
| 68 | 9.5 | 0.5 | — | balance | 0.2 | 0.3 | 2.0 | — | balance | 0.5 |
| 69 | 9.5 | 0.5 | — | balance | 0.2 | 0.3 | 1.6 | Cu: 0.05 | balance | 0.5 |
| 70 | 9.5 | 0.5 | — | balance | 0.2 | 0.3 | 1.6 | Cu: 0.6 | balance | 0.5 |
| 71 | 9.5 | 0.5 | — | balance | 0.2 | 0.3 | 1.6 | Cu: 1.0 | balance | 0.5 |
| 72 | 9.5 | 0.5 | — | balance | 0.2 | 0.3 | 1.6 | Zn: 0.05 | balance | 0.5 |
| 73 | 9.5 | 0.5 | — | balance | 0.2 | 0.3 | 1.6 | Zn: 2.0 | balance | 0.5 |
| 74 | 9.5 | 0.5 | — | balance | 0.2 | 0.3 | 1.6 | Zn: 3.0 | balance | 0.5 |

| Example No. | Alloy composition of intermediate layer material (mass %) | | | | | Alloy composition of filler material 2 (mass %) | | | |
|---|---|---|---|---|---|---|---|---|---|
| | Si | Fe | Zn | Mn | Al | Si | Fe | Other components | Al |
| 48 | 0.2 | 0.3 | 3.0 | — | balance | 9.5 | 0.5 | — | balance |
| 49 | 0.2 | 0.3 | 3.0 | — | balance | 9.5 | 0.5 | — | balance |
| 50 | 0.2 | 0.3 | 3.0 | — | balance | 9.5 | 0.5 | — | balance |
| 51 | 0.2 | 0.3 | 3.0 | — | balance | 9.5 | 0.5 | — | balance |
| 52 | 0.2 | 0.3 | 3.0 | — | balance | 9.5 | 0.5 | — | balance |
| 53 | 0.2 | 0.3 | 3.0 | — | balance | 9.5 | 0.5 | — | balance |
| 54 | 0.2 | 0.3 | 3.0 | — | balance | 9.5 | 0.5 | Zn: 3.0 | balance |

TABLE 9-continued

| | | | | | | | | | |
|---|---|---|---|---|---|---|---|---|---|
| 55 | 0.2 | 0.3 | 3.0 | — | balance | 9.5 | 0.5 | — | balance |
| 56 | 0.2 | 0.3 | 3.0 | — | balance | 9.5 | 0.5 | — | balance |
| 57 | 0.2 | 0.3 | 3.0 | — | balance | 9.5 | 0.5 | — | balance |
| 58 | 0.2 | 0.3 | 3.0 | — | balance | 9.5 | 0.5 | — | balance |
| 59 | 0.2 | 0.3 | 3.0 | — | balance | 9.5 | 0.5 | Sr: 0.03 | balance |
| 60 | 0.2 | 0.3 | 3.0 | — | balance | 9.5 | 0.5 | — | balance |
| 61 | 0.2 | 0.3 | 3.0 | — | balance | 9.5 | 0.5 | — | balance |
| 62 | 0.2 | 0.3 | 3.0 | — | balance | 9.5 | 0.5 | — | balance |
| 63 | 0.2 | 0.3 | 3.0 | — | balance | 9.5 | 0.5 | — | balance |
| 64 | 0.2 | 0.3 | 3.0 | — | balance | 9.5 | 0.5 | — | balance |
| 65 | 0.2 | 0.3 | 3.0 | — | balance | 9.5 | 0.5 | — | balance |
| 66 | 0.2 | 0.3 | 3.0 | — | balance | 9.5 | 0.5 | — | balance |
| 67 | 0.2 | 0.3 | 3.0 | — | balance | 9.5 | 0.5 | — | balance |
| 68 | 0.2 | 0.3 | 3.0 | — | balance | 9.5 | 0.5 | — | balance |
| 69 | 0.2 | 0.3 | 3.0 | — | balance | 9.5 | 0.5 | — | balance |
| 70 | 0.2 | 0.3 | 3.0 | — | balance | 9.5 | 0.5 | — | balance |
| 71 | 0.2 | 0.3 | 3.0 | — | balance | 9.5 | 0.5 | — | balance |
| 72 | 0.2 | 0.3 | 3.0 | — | balance | 9.5 | 0.5 | — | balance |
| 73 | 0.2 | 0.3 | 3.0 | — | balance | 9.5 | 0.5 | — | balance |
| 74 | 0.2 | 0.3 | 3.0 | — | balance | 9.5 | 0.5 | — | balance |

TABLE 10

| | Alloy composition of filler material 1 (mass %) | | | | Alloy composition of core material (mass %) | | | | | |
|---|---|---|---|---|---|---|---|---|---|---|
| Example No. | Si | Fe | Other components | Al | Si | Fe | Mn | Other components | Al | Si + Fe |
| 75 | 9.5 | 0.5 | — | balance | 0.2 | 0.3 | 1.6 | Ti: 0.05 | balance | 0.5 |
| 76 | 9.5 | 0.5 | — | balance | 0.2 | 0.3 | 1.6 | Ti: 0.15 | balance | 0.5 |
| 77 | 9.5 | 0.5 | — | balance | 0.2 | 0.3 | 1.6 | Ti: 0.3 | balance | 0.5 |
| 78 | 9.5 | 0.5 | — | balance | 0.2 | 0.3 | 1.6 | Zr: 0.05 | balance | 0.5 |
| 79 | 9.5 | 0.5 | — | balance | 0.2 | 0.3 | 1.6 | Zr: 0.15 | balance | 0.5 |
| 80 | 9.5 | 0.5 | — | balance | 0.2 | 0.3 | 1.6 | Zr: 0.3 | balance | 0.5 |
| 81 | 9.5 | 0.5 | — | balance | 0.2 | 0.3 | 1.6 | Cr: 0.05 | balance | 0.5 |
| 82 | 9.5 | 0.5 | — | balance | 0.2 | 0.3 | 1.6 | Cr: 0.15 | balance | 0.5 |
| 83 | 9.5 | 0.5 | — | balance | 0.2 | 0.3 | 1.6 | Cr: 0.3 | balance | 0.5 |
| 84 | 9.5 | 0.5 | — | balance | 0.2 | 0.3 | 1.6 | — | balance | 0.5 |
| 85 | 9.5 | 0.5 | — | balance | 0.2 | 0.3 | 1.6 | — | balance | 0.5 |
| 86 | 9.5 | 0.5 | — | balance | 0.2 | 0.3 | 1.6 | — | balance | 0.5 |
| 87 | 9.5 | 0.5 | — | balance | 0.2 | 0.3 | 1.6 | — | balance | 0.5 |
| 88 | 9.5 | 0.5 | — | balance | 0.2 | 0.3 | 1.6 | — | balance | 0.5 |
| 89 | 9.5 | 0.5 | — | balance | 0.2 | 0.3 | 1.6 | — | balance | 0.5 |
| 90 | 9.5 | 0.5 | — | balance | 0.05 | 0.3 | 1.6 | — | balance | 0.5 |
| 91 | 9.5 | 0.5 | — | balance | 0.6 | 0.3 | 1.6 | — | balance | 0.5 |
| 92 | 9.5 | 0.5 | — | balance | 0.2 | 0.05 | 1.6 | — | balance | 0.5 |
| 93 | 9.5 | 0.5 | — | balance | 0.2 | 0.7 | 1.6 | — | balance | 0.5 |
| 94 | 9.5 | 0.5 | — | balance | 0.2 | 0.3 | 0.6 | — | balance | 0.5 |
| 95 | 9.5 | 0.5 | — | balance | 0.2 | 0.3 | 2.0 | — | balance | 0.5 |
| 96 | 9.5 | 0.5 | — | balance | 0.2 | 0.3 | 1.6 | — | balance | 0.5 |
| 97 | 9.5 | 0.5 | — | balance | 0.2 | 0.3 | 1.6 | — | balance | 0.5 |
| 98 | 9.5 | 0.5 | — | balance | 0.2 | 0.3 | 1.6 | — | balance | 0.5 |
| 99 | 9.5 | 0.5 | — | balance | 0.2 | 0.3 | 1.6 | — | balance | 0.5 |
| 100 | 9.5 | 0.5 | — | balance | 0.2 | 0.3 | 1.6 | — | balance | 0.5 |
| 101 | 9.5 | 0.5 | — | balance | 0.2 | 0.3 | 1.6 | — | balance | 0.5 |

| | Alloy composition of intermediate layer material | | | | | Alloy composition of filler material 2 (mass %) | | | |
|---|---|---|---|---|---|---|---|---|---|
| | (mass %) | | | | | | | Other | |
| Example No. | Si | Fe | Zn | Mn | Al | Si | Fe | components | Al |
| 75 | 0.2 | 0.3 | 3.0 | — | balance | 9.5 | 0.5 | — | balance |
| 76 | 0.2 | 0.3 | 3.0 | — | balance | 9.5 | 0.5 | — | balance |
| 77 | 0.2 | 0.3 | 3.0 | — | balance | 9.5 | 0.5 | — | balance |
| 78 | 0.2 | 0.3 | 3.0 | — | balance | 9.5 | 0.5 | — | balance |
| 79 | 0.2 | 0.3 | 3.0 | — | balance | 9.5 | 0.5 | — | balance |
| 80 | 0.2 | 0.3 | 3.0 | — | balance | 9.5 | 0.5 | — | balance |
| 81 | 0.2 | 0.3 | 3.0 | — | balance | 9.5 | 0.5 | — | balance |
| 82 | 0.2 | 0.3 | 3.0 | — | balance | 9.5 | 0.5 | — | balance |
| 83 | 0.2 | 0.3 | 3.0 | — | balance | 9.5 | 0.5 | — | balance |
| 84 | 0.05 | 0.3 | 3.0 | — | balance | 9.5 | 0.5 | — | balance |
| 85 | 0.6 | 0.3 | 3.0 | — | balance | 9.5 | 0.5 | — | balance |
| 86 | 0.2 | 0.05 | 3.0 | — | balance | 9.5 | 0.5 | — | balance |
| 87 | 0.2 | 0.7 | 3.0 | — | balance | 9.5 | 0.5 | — | balance |

TABLE 10-continued

| | | | | | | | | | |
|---|---|---|---|---|---|---|---|---|---|
| 88 | 0.2 | 0.3 | 0.05 | — | balance | 9.5 | 0.5 | — | balance |
| 89 | 0.2 | 0.3 | 5.0 | — | balance | 9.5 | 0.5 | — | balance |
| 90 | 0.2 | 0.3 | 3.0 | 0.05 | balance | 9.5 | 0.5 | — | balance |
| 91 | 0.2 | 0.3 | 3.0 | 1.6 | balance | 9.5 | 0.5 | — | balance |
| 92 | 0.2 | 0.3 | 3.0 | 2.0 | balance | 9.5 | 0.5 | — | balance |
| 93 | 0.2 | 0.3 | 3.0 | — | balance | 9.5 | 0.5 | — | balance |
| 94 | 0.2 | 0.3 | 3.0 | — | balance | 9.5 | 0.5 | — | balance |
| 95 | 0.2 | 0.3 | 3.0 | — | balance | 9.5 | 0.5 | — | balance |
| 96 | 0.2 | 0.3 | 3.0 | — | balance | 9.5 | 0.5 | — | balance |
| 97 | 0.2 | 0.3 | 3.0 | — | balance | 9.5 | 0.5 | — | balance |
| 98 | 0.2 | 0.3 | 3.0 | — | balance | 9.5 | 0.5 | — | balance |
| 99 | 0.2 | 0.3 | 3.0 | — | balance | 9.5 | 0.5 | — | balance |
| 100 | 0.2 | 0.3 | 3.0 | — | balance | 9.5 | 0.5 | — | balance |
| 101 | 0.2 | 0.3 | 3.0 | — | balance | 9.5 | 0.5 | — | balance |

TABLE 11

| | Hot clad-rolling | | | | |
|---|---|---|---|---|---|
| Example No. | Highest rate of strain ($s^{-1}$) | Highest temperature (° C.) | Temper | Thickness (mm) | Productivity |
| 48 | 8 | 450 | H14 | 1.5 | Good |
| 49 | 8 | 450 | H14 | 1.5 | Good |
| 50 | 8 | 450 | H14 | 1.5 | Good |
| 51 | 8 | 450 | H14 | 1.5 | Good |
| 52 | 8 | 450 | H14 | 1.5 | Good |
| 53 | 8 | 450 | H14 | 1.5 | Good |
| 54 | 8 | 450 | H14 | 1.5 | Good |
| 55 | 8 | 450 | H14 | 1.5 | Good |
| 56 | 8 | 450 | H14 | 1.5 | Good |
| 57 | 8 | 450 | H14 | 1.5 | Good |
| 58 | 8 | 450 | H14 | 1.5 | Good |
| 59 | 8 | 450 | H14 | 1.5 | Good |
| 60 | 8 | 450 | H14 | 1.5 | Good |
| 61 | 8 | 450 | H14 | 1.5 | Good |
| 62 | 8 | 450 | H14 | 1.5 | Good |
| 63 | 8 | 450 | H14 | 1.5 | Good |
| 64 | 8 | 450 | H14 | 1.5 | Good |
| 65 | 8 | 450 | H14 | 1.5 | Good |
| 66 | 8 | 450 | H14 | 1.5 | Good |
| 67 | 8 | 450 | H14 | 1.5 | Good |
| 68 | 8 | 450 | H14 | 1.5 | Good |
| 69 | 8 | 450 | H14 | 1.5 | Good |
| 70 | 8 | 450 | H14 | 1.5 | Good |
| 71 | 8 | 450 | H14 | 1.5 | Good |
| 72 | 8 | 450 | H14 | 1.5 | Good |
| 73 | 8 | 450 | H14 | 1.5 | Good |
| 74 | 8 | 450 | H14 | 1.5 | Good |

TABLE 12

| | Hot clad-rolling | | | | |
|---|---|---|---|---|---|
| Example No. | Highest rate of strain ($s^{-1}$) | Highest temperature (° C.) | Temper | Thickness (mm) | Productivity |
| 75 | 8 | 450 | H14 | 1.5 | Good |
| 76 | 8 | 450 | H14 | 1.5 | Good |
| 77 | 8 | 450 | H14 | 1.5 | Good |
| 78 | 8 | 450 | H14 | 1.5 | Good |
| 79 | 8 | 450 | H14 | 1.5 | Good |
| 80 | 8 | 450 | H14 | 1.5 | Good |
| 81 | 8 | 450 | H14 | 1.5 | Good |
| 82 | 8 | 450 | H14 | 1.5 | Good |
| 83 | 8 | 450 | H14 | 1.5 | Good |
| 84 | 8 | 450 | H14 | 1.5 | Good |
| 85 | 8 | 450 | H14 | 1.5 | Good |
| 86 | 8 | 450 | H14 | 1.5 | Good |
| 87 | 8 | 450 | H14 | 1.5 | Good |
| 88 | 8 | 450 | H14 | 1.5 | Good |
| 89 | 8 | 450 | H14 | 1.5 | Good |
| 90 | 8 | 450 | H14 | 1.5 | Good |
| 91 | 8 | 450 | H14 | 1.5 | Good |
| 92 | 8 | 450 | H14 | 1.5 | Good |
| 93 | 0.5 | 450 | H14 | 1.5 | Good |
| 94 | 10 | 450 | H14 | 1.5 | Good |
| 95 | 8 | 400 | H14 | 1.5 | Good |
| 96 | 8 | 510 | H14 | 1.5 | Good |
| 97 | 8 | 450 | H12 | 1.5 | Good |
| 98 | 8 | 450 | H16 | 1.5 | Good |
| 99 | 8 | 450 | H22 | 1.5 | Good |
| 100 | 8 | 450 | H24 | 1.5 | Good |
| 101 | 8 | 450 | H26 | 1.5 | Good |

TABLE 13

| Comparative Example No. | Alloy composition of filler material 1 (mass %) | | | | | Alloy composition of core material (mass %) | | | | | |
|---|---|---|---|---|---|---|---|---|---|---|---|
| | Si | Fe | Other components | | Al | Si | Fe | Mn | Other components | Al | Si + Fe |
| 29 | 3.0 | 0.5 | — | | balance | 0.2 | 0.3 | 1.6 | — | balance | 0.5 |
| 30 | 15.0 | 0.5 | — | | balance | 0.2 | 0.3 | 1.6 | — | balance | 0.5 |
| 31 | 9.5 | 0.01 | — | | balance | 0.2 | 0.3 | 1.6 | — | balance | 0.5 |
| 32 | 9.5 | 1.0 | — | | balance | 0.2 | 0.3 | 1.6 | — | balance | 0.5 |
| 33 | 9.5 | 0.5 | Cu: 2.0 | | balance | 0.2 | 0.3 | 1.6 | — | balance | 0.5 |
| 34 | 9.5 | 0.5 | Zn: 6.0 | | balance | 0.2 | 0.3 | 1.6 | — | balance | 0.5 |
| 35 | 9.5 | 0.5 | Na: 0.10 | | balance | 0.2 | 0.3 | 1.6 | — | balance | 0.5 |
| 36 | 9.5 | 0.5 | Sr: 0.10 | | balance | 0.2 | 0.3 | 1.6 | — | balance | 0.5 |
| 37 | 9.5 | 0.5 | — | | balance | 0.01 | 0.3 | 1.6 | — | balance | 0.3 |
| 38 | 9.5 | 0.5 | — | | balance | 0.8 | 0.3 | 1.6 | — | balance | 1.1 |
| 39 | 9.5 | 0.5 | — | | balance | 0.2 | 0.01 | 1.6 | — | balance | 0.2 |
| 40 | 9.5 | 0.5 | — | | balance | 0.2 | 1.0 | 1.6 | — | balance | 1.2 |
| 41 | 9.5 | 0.5 | — | | balance | 0.2 | 0.3 | 0.5 | — | balance | 0.5 |
| 42 | 9.5 | 0.5 | — | | balance | 0.2 | 0.3 | 2.2 | — | balance | 0.5 |
| 43 | 9.5 | 0.5 | — | | balance | 0.6 | 0.7 | 1.2 | — | balance | 1.3 |

TABLE 13-continued

| | Si | Fe | — | Al | | | | Other | Al | |
|---|---|---|---|---|---|---|---|---|---|---|
| 44 | 9.5 | 0.5 | — | balance | 0.2 | 0.3 | 1.6 | Cu: 1.2 | balance | 0.5 |
| 45 | 9.5 | 0.5 | — | balance | 0.2 | 0.3 | 1.6 | Zn: 4.0 | balance | 0.5 |
| 46 | 9.5 | 0.5 | — | balance | 0.2 | 0.3 | 1.6 | Ti: 0.4 | balance | 0.5 |
| 47 | 9.5 | 0.5 | — | balance | 0.2 | 0.3 | 1.6 | Zr: 0.4 | balance | 0.5 |
| 48 | 9.5 | 0.5 | — | balance | 0.2 | 0.3 | 1.6 | Cr: 0.4 | balance | 0.5 |
| 49 | 9.5 | 0.5 | — | balance | 0.2 | 0.3 | 1.6 | — | balance | 0.5 |
| 50 | 9.5 | 0.5 | — | balance | 0.2 | 0.3 | 1.6 | — | balance | 0.5 |
| 51 | 9.5 | 0.5 | — | balance | 0.2 | 0.3 | 1.6 | — | balance | 0.5 |
| 52 | 9.5 | 0.5 | — | balance | 0.2 | 0.3 | 1.6 | — | balance | 0.5 |
| 53 | 9.5 | 0.5 | — | balance | 0.2 | 0.3 | 1.6 | — | balance | 0.5 |
| 54 | 9.5 | 0.5 | — | balance | 0.2 | 0.3 | 1.6 | — | balance | 0.5 |
| 55 | 9.5 | 0.5 | — | balance | 0.2 | 0.3 | 1.6 | — | balance | 0.5 |
| 56 | 9.5 | 0.5 | — | balance | 0.2 | 0.3 | 1.6 | — | balance | 0.5 |
| 57 | 9.5 | 0.5 | — | balance | 0.2 | 0.3 | 1.6 | — | balance | 0.5 |
| 58 | 9.5 | 0.5 | — | balance | 0.2 | 0.3 | 1.6 | — | balance | 0.5 |
| 59 | 9.5 | 0.5 | — | balance | 0.2 | 0.3 | 1.6 | — | balance | 0.5 |
| 60 | 9.5 | 0.5 | — | balance | 0.2 | 0.3 | 1.6 | — | balance | 0.5 |
| 61 | 9.5 | 0.5 | — | balance | 0.2 | 0.3 | 1.6 | — | balance | 0.5 |
| 62 | 9.5 | 0.5 | — | balance | 0.2 | 0.3 | 1.6 | — | balance | 0.5 |

| Comparative Example No. | Alloy composition of intermediate layer material (mass %) | | | | | Alloy composition of filler material 2 (mass %) | | | |
|---|---|---|---|---|---|---|---|---|---|
| | Si | Fe | Zn | Mn | Al | Si | Fe | Other components | Al |
| 29 | 0.2 | 0.3 | 3.0 | — | balance | 9.5 | 0.5 | — | balance |
| 30 | 0.2 | 0.3 | 3.0 | — | balance | 9.5 | 0.5 | — | balance |
| 31 | 0.2 | 0.3 | 3.0 | — | balance | 9.5 | 0.5 | — | balance |
| 32 | 0.2 | 0.3 | 3.0 | — | balance | 9.5 | 0.5 | — | balance |
| 33 | 0.2 | 0.3 | 3.0 | — | balance | 9.5 | 0.5 | — | balance |
| 34 | 0.2 | 0.3 | 3.0 | — | balance | 9.5 | 0.5 | — | balance |
| 35 | 0.2 | 0.3 | 3.0 | — | balance | 9.5 | 0.5 | — | balance |
| 36 | 0.2 | 0.3 | 3.0 | — | balance | 9.5 | 0.5 | — | balance |
| 37 | 0.2 | 0.3 | 3.0 | — | balance | 9.5 | 0.5 | — | balance |
| 38 | 0.2 | 0.3 | 3.0 | — | balance | 9.5 | 0.5 | — | balance |
| 39 | 0.2 | 0.3 | 3.0 | — | balance | 9.5 | 0.5 | — | balance |
| 40 | 0.2 | 0.3 | 3.0 | — | balance | 9.5 | 0.5 | — | balance |
| 41 | 0.2 | 0.3 | 3.0 | — | balance | 9.5 | 0.5 | — | balance |
| 42 | 0.2 | 0.3 | 3.0 | — | balance | 9.5 | 0.5 | — | balance |
| 43 | 0.2 | 0.3 | 3.0 | — | balance | 9.5 | 0.5 | — | balance |
| 44 | 0.2 | 0.3 | 3.0 | — | balance | 9.5 | 0.5 | — | balance |
| 45 | 0.2 | 0.3 | 3.0 | — | balance | 9.5 | 0.5 | — | balance |
| 46 | 0.2 | 0.3 | 3.0 | — | balance | 9.5 | 0.5 | — | balance |
| 47 | 0.2 | 0.3 | 3.0 | — | balance | 9.5 | 0.5 | — | balance |
| 48 | 0.2 | 0.3 | 3.0 | — | balance | 9.5 | 0.5 | — | balance |
| 49 | 0.01 | 0.3 | 3.0 | — | balance | 9.5 | 0.5 | — | balance |
| 50 | 0.8 | 0.3 | 3.0 | — | balance | 9.5 | 0.5 | — | balance |
| 51 | 0.2 | 0.01 | 3.0 | — | balance | 9.5 | 0.5 | — | balance |
| 52 | 0.2 | 1.0 | 3.0 | — | balance | 9.5 | 0.5 | — | balance |
| 53 | 0.2 | 0.3 | 6.0 | — | balance | 9.5 | 0.5 | — | balance |
| 54 | 0.2 | 0.3 | 3.0 | 2.2 | balance | 9.5 | 0.5 | — | balance |
| 55 | 0.2 | 0.3 | 3.0 | — | balance | 9.5 | 0.5 | — | balance |
| 56 | 0.2 | 0.3 | 3.0 | — | balance | 9.5 | 0.5 | — | balance |
| 57 | 0.2 | 0.3 | 3.0 | — | balance | 9.5 | 0.5 | — | balance |
| 58 | 0.2 | 0.3 | 3.0 | — | balance | 9.5 | 0.5 | — | balance |
| 59 | 0.2 | 0.3 | 3.0 | — | balance | 9.5 | 0.5 | — | balance |
| 60 | 0.2 | 0.3 | 3.0 | — | balance | 9.5 | 0.5 | — | balance |
| 61 | 0.2 | 0.3 | 3.0 | — | balance | 9.5 | 0.5 | — | balance |
| 62 | 0.2 | 0.3 | 3.0 | — | balance | 9.5 | 0.5 | — | balance |

TABLE 14

| Comparative Example No. | Hot clad-rolling | | Temper | Thickness (mm) | Productivity |
|---|---|---|---|---|---|
| | Highest rate of strain ($s^{-1}$) | Highest temperature (° C.) | | | |
| 29 | 8 | 450 | H14 | 1.5 | Good |
| 30 | 8 | 450 | H14 | 1.5 | Good |
| 31 | 8 | 450 | H14 | 1.5 | Good |
| 32 | 8 | 450 | H14 | 1.5 | Good |
| 33 | 8 | 450 | H14 | 1.5 | Good |
| 34 | 8 | 450 | H14 | 1.5 | Good |
| 35 | 8 | 450 | H14 | 1.5 | Good |
| 36 | 8 | 450 | H14 | 1.5 | Good |
| 37 | 8 | 450 | H14 | 1.5 | Good |
| 38 | 8 | 450 | H14 | 1.5 | Good |
| 39 | 8 | 450 | H14 | 1.5 | Good |
| 40 | 8 | 450 | H14 | 1.5 | Good |

TABLE 14-continued

Hot clad-rolling

| Comparative Example No. | Highest rate of strain ($s^{-1}$) | Highest temperature (° C.) | Temper | Thickness (mm) | Productivity |
|---|---|---|---|---|---|
| 41 | 8 | 450 | H14 | 1.5 | Good |
| 42 | 8 | 450 | — | — | Poor |
| 43 | 8 | 450 | H14 | 1.5 | Good |
| 44 | 8 | 450 | H14 | 1.5 | Good |
| 45 | 8 | 450 | H14 | 1.5 | Good |
| 46 | 8 | 450 | — | — | Poor |
| 47 | 8 | 450 | — | — | Poor |
| 48 | 8 | 450 | — | — | Poor |
| 49 | 8 | 450 | — | — | Poor |
| 50 | 8 | 450 | H14 | 1.5 | Good |
| 51 | 8 | 450 | — | — | Poor |
| 52 | 8 | 450 | H14 | 1.5 | Good |
| 53 | 8 | 450 | H14 | 1.5 | Good |
| 54 | 8 | 450 | — | — | Poor |
| 55 | 11 | 450 | H14 | 1.5 | Good |
| 56 | 8 | 390 | H14 | 1.5 | Good |
| 57 | 8 | 520 | H14 | 1.5 | Good |
| 58 | 8 | 450 | O | 1.5 | Good |
| 59 | 8 | 450 | H11 | 1.5 | Good |
| 60 | 8 | 450 | H21 | 1.5 | Good |
| 61 | 8 | 450 | H18 | 1.5 | Good |
| 62 | 8 | 450 | H28 | 1.5 | Good |

In the above-indicated alloy compositions in Tables 9, 10 and 13, "-" means that the contents were smaller than the limit of detection by a spark source atomic emission spectrochemical analyzer, and "balance" means that it consists of Al and inevitable impurities.

With respect to the samples of the four-layered cladded brazing sheets produced as described above, the electric resistivity, the dispersion ratio of the second phase particles in the core material portion, the work hardening exponent (n-value), the push-in depth in the punch stretch forming test, the formability, the brazeability and the corrosion resistance were evaluated, the results of which are indicated in the following Tables 15 to 17. The measuring and evaluation methods are the same as in the case of the above-described three-layered cladded brazing sheet. In the above-indicated Table 14, with respect to the Comparative Examples whose productivity is "Poor", the sample (brazing sheet) could not be produced. Thus, the evaluation could not be performed and the result is represented as "-".

TABLE 15

| Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 48 | 40 | 30 | 0.030 | 14 | Good | Good | Good |
| 49 | 40 | 30 | 0.030 | 14 | Good | Good | Good |
| 50 | 40 | 30 | 0.030 | 14 | Good | Good | Good |
| 51 | 40 | 30 | 0.030 | 14 | Good | Good | Good |
| 52 | 40 | 30 | 0.030 | 14 | Good | Good | Good |
| 53 | 40 | 30 | 0.032 | 14 | Good | Good | Good |
| 54 | 40 | 30 | 0.032 | 14 | Good | Good | Good |
| 55 | 40 | 30 | 0.032 | 14 | Good | Good | Good |
| 56 | 40 | 30 | 0.032 | 14 | Good | Good | Good |
| 57 | 40 | 30 | 0.032 | 14 | Good | Good | Good |
| 58 | 40 | 30 | 0.030 | 14 | Good | Good | Good |
| 59 | 40 | 30 | 0.030 | 14 | Good | Good | Good |
| 60 | 40 | 30 | 0.030 | 14 | Good | Good | Good |
| 61 | 40 | 30 | 0.030 | 14 | Good | Good | Good |
| 62 | 40 | 30 | 0.030 | 14 | Good | Good | Good |
| 63 | 50 | 30 | 0.050 | 18 | Good | Good | Good |
| 64 | 31 | 30 | 0.010 | 10 | Good | Good | Good |
| 65 | 50 | 30 | 0.050 | 18 | Good | Good | Good |
| 66 | 31 | 30 | 0.010 | 10 | Good | Good | Good |
| 67 | 31 | 30 | 0.010 | 10 | Good | Good | Good |
| 68 | 50 | 30 | 0.050 | 18 | Good | Good | Good |
| 69 | 41 | 30 | 0.032 | 14 | Good | Good | Good |
| 70 | 43 | 30 | 0.036 | 15 | Good | Good | Good |
| 71 | 45 | 30 | 0.040 | 16 | Good | Good | Good |
| 72 | 41 | 30 | 0.032 | 14 | Good | Good | Good |
| 73 | 43 | 30 | 0.036 | 15 | Good | Good | Good |
| 74 | 45 | 30 | 0.040 | 16 | Good | Good | Good |
| 75 | 41 | 30 | 0.032 | 14 | Good | Good | Good |
| 76 | 41 | 30 | 0.032 | 14 | Good | Good | Good |
| 77 | 41 | 30 | 0.032 | 14 | Good | Good | Good |
| 78 | 41 | 30 | 0.032 | 14 | Good | Good | Good |
| 79 | 41 | 30 | 0.032 | 14 | Good | Good | Good |
| 80 | 41 | 30 | 0.032 | 14 | Good | Good | Good |

TABLE 16

| Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 81 | 41 | 30 | 0.032 | 14 | Good | Good | Good |
| 82 | 41 | 30 | 0.032 | 14 | Good | Good | Good |
| 83 | 41 | 30 | 0.032 | 14 | Good | Good | Good |
| 84 | 40 | 30 | 0.030 | 14 | Good | Good | Good |
| 85 | 40 | 30 | 0.030 | 14 | Good | Good | Good |
| 86 | 40 | 30 | 0.030 | 14 | Good | Good | Good |
| 87 | 40 | 30 | 0.030 | 14 | Good | Good | Good |
| 88 | 40 | 30 | 0.010 | 10 | Good | Good | Good |
| 89 | 40 | 30 | 0.034 | 15 | Good | Good | Good |
| 90 | 40 | 30 | 0.030 | 14 | Good | Good | Good |
| 91 | 40 | 30 | 0.040 | 16 | Good | Good | Good |
| 92 | 40 | 30 | 0.050 | 18 | Good | Good | Good |
| 93 | 50 | 30 | 0.050 | 18 | Good | Good | Good |
| 94 | 31 | 30 | 0.010 | 10 | Good | Good | Good |
| 95 | 40 | 50 | 0.010 | 10 | Good | Good | Good |
| 96 | 40 | 5 | 0.050 | 18 | Good | Good | Good |
| 97 | 40 | 30 | 0.035 | 15 | Good | Good | Good |
| 98 | 40 | 30 | 0.025 | 13 | Good | Good | Good |
| 99 | 40 | 30 | 0.050 | 18 | Good | Good | Good |
| 100 | 40 | 30 | 0.040 | 16 | Good | Good | Good |
| 101 | 40 | 30 | 0.030 | 14 | Good | Good | Good |

TABLE 17

| Comparative Example No. | Metal structure | | Properties | | | | |
|---|---|---|---|---|---|---|---|
| | Electric resistivity (nΩm) | Dispersion ratio (% · μm$^{-1}$) | n-value | Push-in depth (mm) | Formability | Brazeability | Corrosion resistance |
| 29 | 40 | 30 | 0.030 | 14 | Good | Poor | Poor |
| 30 | 40 | 30 | 0.030 | 14 | Good | Poor | Poor |
| 31 | 40 | 30 | 0.030 | 14 | Good | Poor | Poor |
| 32 | 40 | 30 | 0.030 | 14 | Good | Good | Poor |
| 33 | 40 | 30 | 0.030 | 14 | Good | Good | Poor |
| 34 | 40 | 30 | 0.030 | 14 | Good | Good | Poor |
| 35 | 40 | 30 | 0.030 | 14 | Good | Poor | Poor |
| 36 | 40 | 30 | 0.030 | 14 | Good | Poor | Poor |
| 37 | 52 | 30 | 0.054 | 19 | Good | Poor | Poor |
| 38 | 29 | 30 | 0.008 | 9 | Poor | Poor | Poor |
| 39 | 52 | 30 | 0.054 | 19 | Good | Poor | Poor |
| 40 | 29 | 30 | 0.008 | 9 | Poor | Poor | Poor |
| 41 | 29 | 30 | 0.008 | 9 | Poor | Poor | Poor |
| 42 | — | — | — | — | — | — | — |
| 43 | 29 | 30 | 0.008 | 9 | Poor | Poor | Poor |
| 44 | 46 | 30 | 0.042 | 16 | Good | Good | Poor |
| 45 | 46 | 30 | 0.042 | 16 | Good | Good | Poor |
| 46 | — | — | — | — | — | — | — |
| 47 | — | — | — | — | — | — | — |
| 48 | — | — | — | — | — | — | — |
| 49 | — | — | — | — | — | — | — |
| 50 | 40 | 30 | 0.030 | 14 | Good | Good | Poor |
| 51 | — | — | — | — | — | — | — |
| 52 | 40 | 30 | 0.030 | 14 | Good | Good | Poor |
| 53 | 43 | 30 | 0.036 | 15 | Good | Good | Poor |
| 54 | — | — | — | — | — | — | — |
| 55 | 29 | 30 | 0.008 | 8 | Poor | Poor | Poor |
| 56 | 40 | 51 | 0.008 | 9 | Poor | Poor | Poor |
| 57 | 40 | 4 | 0.052 | 18 | Good | Poor | Poor |
| 58 | 40 | 30 | 0.060 | 20 | Good | Poor | Poor |
| 59 | 40 | 30 | 0.038 | 16 | Good | Poor | Poor |
| 60 | 40 | 30 | 0.053 | 19 | Good | Poor | Poor |
| 61 | 40 | 30 | 0.020 | 12 | Good | Poor | Poor |
| 62 | 40 | 30 | 0.025 | 13 | Good | Poor | Poor |

As is apparent from the results shown in Tables 15 and 16, in the samples of the Examples 48-101, the alloy compositions, the metal structures and properties of the core materials, the filler materials and the intermediate layer materials were within the range defined in the invention. Furthermore, also the production conditions satisfied the conditions defined in the invention. For this reason, the samples enjoyed desirable productivity, and also exhibited excellent formability, brazeability and corrosion resistance.

In contrast, as is apparent from Table 17, in the samples of the Comparative Examples 29-36, the alloy compositions of the filler materials were outside the range defined in the invention, so that they suffered from various problems as described below. That is to say, in the Comparative Example 29, the filler material contained an insufficient amount of Si, and had an insufficient amount of molten filler material, resulting in unsatisfactory brazeability. As a result, the joining portion was subjected to corrosion and penetration, so that also the corrosion resistance was unsatisfactory. In the Comparative Example 30, the filler material contained an excessively large amount of Si, thereby causing erosion by the filler material, resulting in unsatisfactory brazeability. As a result, the joining portion was subjected to corrosion and penetration, so that also the corrosion resistance was unsatisfactory. In the Comparative Example 31, the filler material contained an insufficient amount of Fe, thereby causing deterioration of the fluidity of the filler material, resulting in unsatisfactory brazeability. As a result, the joining portion was subjected to corrosion and penetration, so that also the corrosion resistance was unsatisfactory. In the Comparative Example 32, the filler material contained an excessively large amount of Fe, thereby causing an increase of the self-corrosion rate, resulting in unsatisfactory corrosion resistance. In the Comparative Example 33, the filler material contained an excessively large amount of Cu, thereby causing an increase of the self-corrosion rate, resulting in unsatisfactory corrosion resistance. In the Comparative Example 34, the filler material contained an excessively large amount of Zn, thereby causing an increase of the corrosion rate of the fillet, resulting in unsatisfactory corrosion resistance. In the Comparative Example 35, the filler material contained an excessively large amount of Na, thereby causing deterioration of the fluidity of the filler material, resulting in unsatisfactory brazeability. As a result, the joining portion was subjected to corrosion and penetration, so that also the corrosion resistance was unsatisfactory. In the Comparative Example 36, the filler material contained an excessively large amount of Sr, thereby causing deterioration of the fluidity of the filler material, resulting in unsatisfactory brazeability. As a result, the joining portion was subjected to corrosion and penetration, so that also the corrosion resistance was unsatisfactory.

In the Comparative Examples 37-48, since the alloy compositions of the core materials were outside the range defined in the invention, the results were as follows. That is to say, in the Comparative Example 37, the core material contained an insufficient amount of Si, thereby causing erosion by the filler material, resulting in unsatisfactory brazeability. As a result, the joining portion was subjected to corrosion and penetration, so that also the corrosion resistance was unsatisfactory. In the Comparative Example 38, the core material contained an excessively large amount of Si and the n-value was small, resulting in unsatisfactory formability. As a result, no fillet was formed, and also the brazeability was unsatisfactory, so that the joining portion was subjected to corrosion and penetration and further the corrosion resistance was unsatisfactory. In the Comparative Example 39, the core material contained an insufficient amount of Fe, thereby causing erosion by the filler material, resulting in unsatisfactory brazeability. As a result, the joining portion was subjected to corrosion and penetration, so that also the corrosion resistance was unsatisfactory. In the Comparative Example 40, the core material contained an excessively large amount of Fe and the n-value was small, resulting in unsatisfactory formability. As a result, no fillet was formed, and also the brazeability was unsatisfactory, so that the joining portion was subjected to corrosion and penetration and further the corrosion resistance was unsatisfactory. In the Comparative Example 41, the core material contained an insufficient amount of Mn and the n-value was small, resulting in unsatisfactory formability. As a result, no fillet was formed, and also the brazeability was unsatisfactory, so that the joining portion was subjected to corrosion and penetration and further the corrosion resistance was unsatisfactory.

In the Comparative Example 42, the core material contained an excessively large amount of Mn, thereby causing breakage of the sheet during the cold rolling, so that a brazing sheet could not be produced. In the Comparative Example 43, the total content of Si and Fe in the core material exceeded the content of Mn and the n-value was small, resulting in unsatisfactory formability. As a result, no fillet was formed and also the brazeability was unsatisfactory, so that the joining portion was subjected to corrosion and penetration and further the corrosion resistance was unsatisfactory. In the Comparative Example 44, the core material contained an excessively large amount of Cu, thereby causing an increase of the self-corrosion rate, resulting in unsatisfactory corrosion resistance. In the Comparative Example 45, the core material contained an excessively large amount of Zn, thereby causing an increase of the self-corrosion rate, resulting in unsatisfactory corrosion resistance. In the Comparative Examples 46-48, the core material contained excessive amounts of Ti, Zr and Cr, respectively, so that breakage was caused in the sheet during the cold rolling and a brazing sheet could not be produced.

Furthermore, in the Comparative Examples 49-54, since the alloy compositions of the intermediate layer materials were outside the range defined in the invention, the results were as follows. That is to say, in the Comparative Example 49, the intermediate layer material contained an insufficient amount of Si, so that bonding deficiency was caused during the hot clad-rolling process and a brazing sheet could not be produced. In the Comparative Example 50, the intermediate layer material contained an excessively large amount of Si, thereby causing an increase of the self-corrosion rate, resulting in unsatisfactory corrosion resistance. In the Comparative Example 51, the intermediate layer material contained an insufficient amount of Fe, so that bonding deficiency was caused during the hot clad-rolling process and a brazing sheet could not be produced. In the Comparative Example 52, the intermediate layer material contained an excessively large amount of Fe, thereby causing an increase of the self-corrosion rate, resulting in unsatisfactory corrosion resistance. In the Comparative Example 53, the intermediate layer material contained an excessively large amount of Zn, thereby causing an increase of the self-corrosion rate, resulting in unsatisfactory corrosion resistance. In the Comparative Example 54, the intermediate layer material contained an excessively large amount of Mn, so that breakage was caused in the sheet during the cold rolling and a brazing sheet could not be produced.

Furthermore, in the Comparative Examples 55-62, since the production conditions of the samples (brazing sheets)

were outside the conditions defined in the invention, the results were as follows. That is to say, in the Comparative Example 55, the highest rate of strain in the hot clad-rolling process was excessively high and the n-value was small, resulting in unsatisfactory formability. As a result, no fillet was formed and also the brazeability was unsatisfactory, so that the joining portion was subjected to corrosion and penetration, and further the corrosion resistance was unsatisfactory. In the Comparative Example 56, the highest temperature during the hot clad-rolling process was too low and the n-value was small, resulting in unsatisfactory formability. As a result, no fillet was formed and also the brazeability was unsatisfactory, so that the joining portion was subjected to corrosion and penetration, and further the corrosion resistance was unsatisfactory. In the Comparative Example 57, the highest temperature during the hot clad-rolling process was excessively high, so that erosion by the filler material was caused, resulting in unsatisfactory brazeability. As a result, the joining portion was subjected to corrosion and penetration, and further the corrosion resistance was unsatisfactory.

In addition, in each of the Comparative Example 58-62, the temper designations were 0, H11, H21, H18 and H28, respectively, so that erosion by the filler material was caused, resulting in unsatisfactory brazeability. As a result, the joining portion was subjected to corrosion and penetration and further the corrosion resistance was unsatisfactory.

INDUSTRIAL APPLICABILITY

The aluminum alloy brazing sheet for a heat exchanger according to the invention permits both of excellent formability and excellent brazeability, so that it can be advantageously used for a structural member and a fin for a heat exchanger. In particular, the sheet has a remarkably high degree of industrial applicability as a component used in a heat exchanger for an automobile.

| NOMENCLATURE OF REFERENCE SIGNS | |
|---|---|
| 2: Round-Head Punch | 4: Dice |
| 6: Blank Holder | 8: Sample |
| 10: Miniature Core Assembly Body | 12: Plates |
| 14: Fins | 16: Extruded multi-port tubes |

The invention claimed is:

1. An aluminum alloy brazing sheet for a heat exchanger, comprising a core material, a first filler material cladded on one surface of the core material and a second filler material cladded on the other surface of the core material, wherein:
   the core material consists of an Al alloy including 0.05-0.6% by mass of Si, 0.05-0.7% by mass of Fe and 0.6-2.0% by mass of Mn, the balance being Al and inevitable impurities, contents of Si, Fe and Mn satisfying a formula: Si+Fe≤Mn; and
   each of the first and second filler materials consists of an Al—Si based alloy including 4.5-13.0% by mass of Si and 0.05-0.8% by mass of Fe, the balance being Al and inevitable impurities, and wherein
   the brazing sheet is given a temper designation of HXY, X being 1 or 2 and Y being a natural number from 2 to 6, and has an electric resistivity at room temperature of 31-50 nΩm in a portion formed of the core material;
   a dispersion ratio of second phase particles having a circle equivalent diameter of not more than 0.5 μm is 5-50%·μm$^{-1}$ in the portion formed of the core material, the dispersion ratio of the second phase particles being defined as f/r, wherein f (%) represents an area ratio of the second phase particles while r (μm) represents an average circle equivalent diameter of the second phase particles;
   the brazing sheet has an n-value of a work hardening exponent of not less than 0.010, where a nominal strain is within a range of 1%-2%; and
   the brazing sheet has a push-in depth of not less than 10 mm when a penetration crack is generated in a punch stretch forming test using a round-head punch having a diameter of 50 mm.

2. An aluminum alloy brazing sheet for a heat exchanger, comprising a core material, a first filler material cladded on one surface of the core material, an intermediate layer material cladded on the other surface of the core material, and a second filler material cladded on a surface of the intermediate layer material opposite to the core material, wherein:
   the core material consists of an Al alloy including 0.05-0.6% by mass of Si, 0.05-0.7% by mass of Fe and 0.6-2.0% by mass of Mn, the balance being Al and inevitable impurities, contents of Si, Fe and Mn satisfying a formula: Si+Fe≤Mn;
   each of the first and second filler materials consists of an Al—Si based alloy including 4.5-13.0% by mass of Si and 0.05-0.8% by mass of Fe, the balance being Al and inevitable impurities; and
   the intermediate layer material consists of an Al alloy including 0.05-0.6% by mass of Si, 0.05-0.7% by mass of Fe and 0.05-5.0% by mass of Zn, the balance being Al and inevitable impurities, and wherein
   the brazing sheet is given a temper designation of HXY, X being 1 or 2 and Y being a natural number from 2 to 6, and has an electric resistivity at room temperature of 31-50nΩm in a portion formed of the core material;
   a dispersion ratio of second phase particles having a circle equivalent diameter of not more than 0.5 μm is 5-50%·μm$^{-1}$ in the portion formed of the core material, the dispersion ratio of the second phase particles being defined as f/r, wherein f (%) represents an area ratio of the second phase particles while r (μm) represents an average circle equivalent diameter of the second phase particles; and
   the brazing sheet has an n-value of a work hardening exponent of not less than 0.010, where a nominal strain is within a range of 1%-2%; and
   the brazing sheet has a push-in depth of not less than 10 mm when a penetration crack is generated in a punch stretch forming test using a round-head punch having a diameter of 50 mm.

3. The aluminum alloy brazing sheet for a heat exchanger according to claim 1, wherein the Al alloy constituting the core material further includes at least one of 0.05-1.0% by mass of Cu and 0.05-3.0% by mass of Zn.

4. The aluminum alloy brazing sheet for a heat exchanger according to claim 1, wherein the Al alloy constituting the core material further includes at least one of 0.05-0.3% by mass of Ti, 0.05-0.3% by mass of Zr and 0.05-0.3% by mass of Cr.

5. The aluminum alloy brazing sheet for a heat exchanger according to claim 1, wherein the Al—Si based alloy constituting the first or second filler material further includes at least one of 0.05-1.5% by mass of Cu and 0.05-5.0% by mass of Zn.

6. The aluminum alloy brazing sheet for a heat exchanger according to claim 1, wherein the Al—Si based alloy constituting the first or second filler material further includes at least one of 0.003-0.05% by mass of Na and 0.03-0.05% by mass of Sr.

7. The aluminum alloy brazing sheet for a heat exchanger according to claim 2, wherein the Al alloy constituting the intermediate layer material further includes 0.05-2.0% by mass of Mn.

8. A process for producing the aluminum alloy brazing sheet for a heat exchanger according to claim 1, comprising a step of performing a hot clad-rolling process wherein the filler materials, or the filler materials and the intermediate layer material, each of which are rolled to have a predetermined thickness, are stacked on opposite surfaces of the core material to form a laminar material and the laminar material is subjected to hot rolling, and wherein
- a maximum rate of strain of a sheet of the laminar material with reduction of its thickness in each pass during a hot rolling operation in the hot clad-rolling process is $0.5\text{-}10\text{s}^{-1}$; and
- a maximum temperature of the laminar material during the hot rolling operation is held within a range of 400-510° C.

9. A structural material for a heat exchanger, comprising the aluminum alloy brazing sheet according to claim 1.

10. A fin for a heat exchanger, comprising the aluminum alloy brazing sheet according to claim 1.

11. The aluminum alloy brazing sheet for a heat exchanger according to claim 2, wherein the Al alloy constituting the core material further includes at least one of 0.05-1.0% by mass of Cu and 0.05-3.0% by mass of Zn.

12. The aluminum alloy brazing sheet for a heat exchanger according to claim 2, wherein the Al alloy constituting the core material further includes at least one of 0.05-0.3% by mass of Ti, 0.05-0.3% by mass of Zr and 0.05-0.3% by mass of Cr.

13. The aluminum alloy brazing sheet for a heat exchanger according to claim 2, wherein the Al—Si based alloy constituting the first or second filler material further includes at least one of 0.05-1.5% by mass of Cu and 0.05-5.0% by mass of Zn.

14. The aluminum alloy brazing sheet for a heat exchanger according to claim 2, wherein the Al—Si based alloy constituting the first or second filler material further includes at least one of 0.003-0.05% by mass of Na and 0.03-0.05% by mass of Sr.

15. A process for producing the aluminum alloy brazing sheet for a heat exchanger according to claim 2, comprising a step of performing a hot clad-rolling process wherein the filler materials, or the filler materials and the intermediate layer material, each of which are rolled to have a predetermined thickness, are stacked on opposite surfaces of the core material to form a laminar material and the laminar material is subjected to hot rolling, and wherein
- a maximum rate of strain of a sheet of the laminar material with reduction of its thickness in each pass during a hot rolling operation in the hot clad-rolling process is $0.5\text{-}10\text{s}^{-1}$; and
- a maximum temperature of the laminar material during the hot rolling operation is held within a range of 400-510° C.

16. A structural material for a heat exchanger, comprising the aluminum alloy brazing sheet according to claim 2.

17. A fin for a heat exchanger, comprising the aluminum alloy brazing sheet according to claim 2.

\* \* \* \* \*